US012619240B1

(12) United States Patent
Aggarwal et al.

(10) Patent No.: US 12,619,240 B1
(45) Date of Patent: May 5, 2026

(54) REALITY CAPTURE ROBOT FOR GENERATING A MAP OF AN ENVIRONMENT

(71) Applicant: Amazon Technologies, Inc., Seattle, WA (US)

(72) Inventors: Aayush Aggarwal, Medford, MA (US); Vishnu R. Ayyagari, Boxboro, MA (US); Kyle Thomas Auger, Boston, MA (US); Loan Thi Tuong Le, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 672 days.

(21) Appl. No.: 17/707,265

(22) Filed: Mar. 29, 2022

(51) Int. Cl.
  *G05D 1/00*          (2024.01)
(52) U.S. Cl.
  CPC ......... *G05D 1/0274* (2013.01); *G05D 1/0061* (2013.01); *G05D 1/0221* (2013.01); *G05D 1/024* (2013.01); *G05D 1/0251* (2013.01); *G05D 1/0287* (2013.01)
(58) Field of Classification Search
  CPC .. G05D 1/0274; G05D 1/0061; G05D 1/0221; G05D 1/024; G05D 1/0251; G05D 1/0287; G05D 1/0088; G05D 1/246; G06V 20/64; G06V 10/70; G06V 10/764; G06V 10/82; G06V 20/58; G06V 10/10; G06N 20/00; G06N 5/04; G06N 3/088;

G06T 2207/10028; G06T 7/11; G06T 7/344; G06T 17/00; G06T 11/003; G06T 17/05; G06T 2207/30261; G06T 2207/10044; G06T 2207/10048; G06T 2207/10012; B25J 13/089
See application file for complete search history.

(56)          References Cited

U.S. PATENT DOCUMENTS

| | | | |
|---|---|---|---|
| 11,348,322 B1 * | 5/2022 | Treskunov | G06T 19/20 |
| 2021/0232149 A1 * | 7/2021 | Griffin | G06V 20/10 |
| 2021/0349468 A1 * | 11/2021 | Bukhari | G05D 1/243 |
| 2022/0244741 A1 * | 8/2022 | da Silva | G05D 1/0214 |
| 2022/0335688 A1 * | 10/2022 | Eckman | G06F 18/2431 |
| 2024/0020968 A1 * | 1/2024 | Haskin | G06F 16/29 |

* cited by examiner

*Primary Examiner* — Tamara L Weber
(74) *Attorney, Agent, or Firm* — Eversheds Sutherland (US) LLP

(57)          ABSTRACT

A robotic device scans at least a portion of an environment. The robotic device includes one or more LiDAR sensors to scan the environment. A management system receives sensor data generated by the one or more LiDAR sensors to determine a three dimensional (3D) point cloud representing at least the portion of the environment. A layout of the environment is determined, where the layout represents a location of objects within the environment. At least one discrepancy between the 3D spatial map and the layout is determined. Based at least in part on at least one discrepancy, a map of the environment is generated.

15 Claims, 12 Drawing Sheets

102

500

100

102

502

108

1000

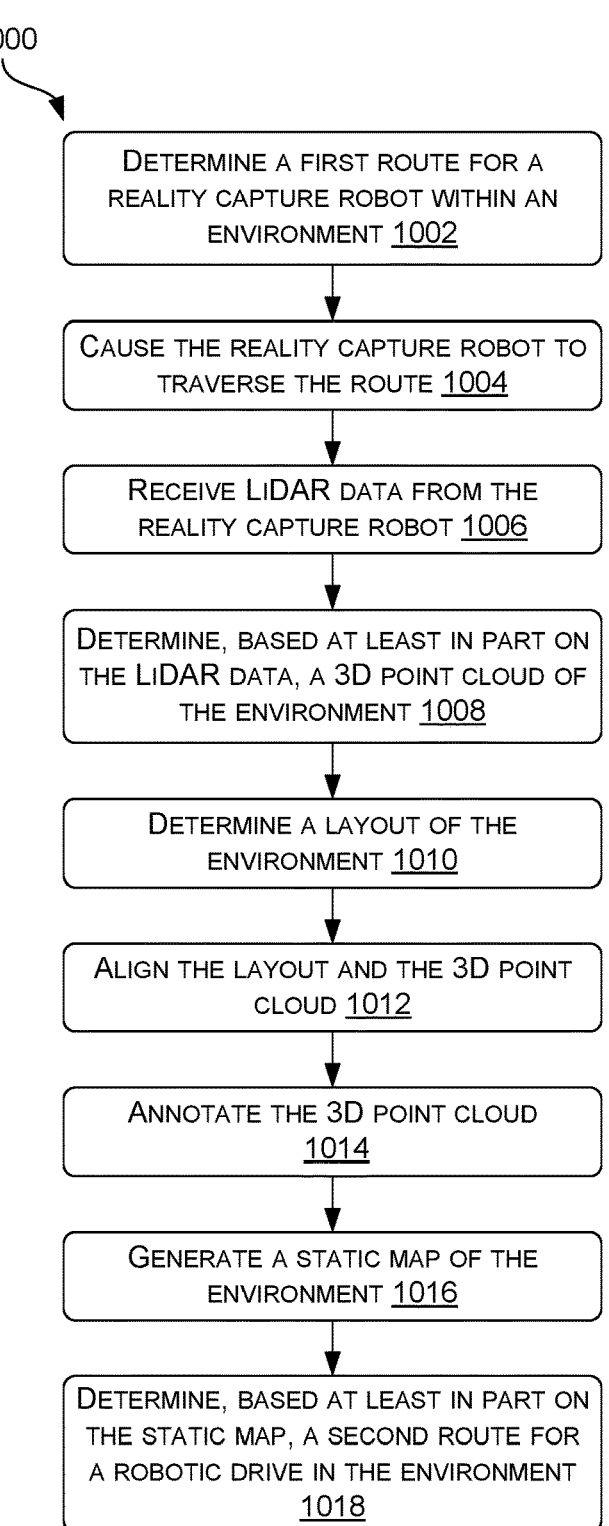

DETERMINE A FIRST ROUTE FOR A REALITY CAPTURE ROBOT WITHIN AN ENVIRONMENT <u>1002</u>

CAUSE THE REALITY CAPTURE ROBOT TO TRAVERSE THE ROUTE <u>1004</u>

RECEIVE LIDAR DATA FROM THE REALITY CAPTURE ROBOT <u>1006</u>

DETERMINE, BASED AT LEAST IN PART ON THE LIDAR DATA, A 3D POINT CLOUD OF THE ENVIRONMENT <u>1008</u>

DETERMINE A LAYOUT OF THE ENVIRONMENT <u>1010</u>

ALIGN THE LAYOUT AND THE 3D POINT CLOUD <u>1012</u>

ANNOTATE THE 3D POINT CLOUD <u>1014</u>

GENERATE A STATIC MAP OF THE ENVIRONMENT <u>1016</u>

DETERMINE, BASED AT LEAST IN PART ON THE STATIC MAP, A SECOND ROUTE FOR A ROBOTIC DRIVE IN THE ENVIRONMENT <u>1018</u>

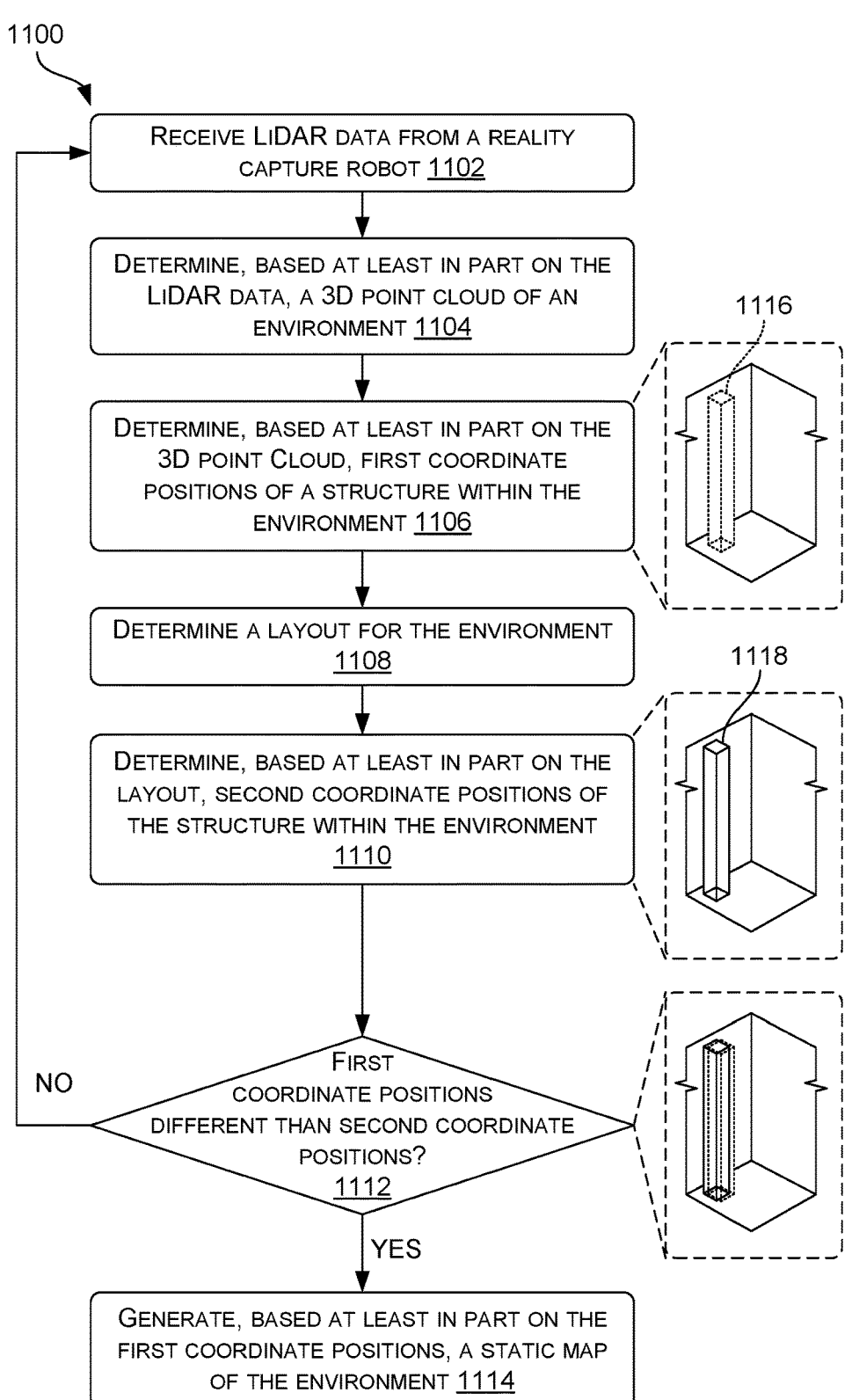

RECEIVE LiDAR DATA FROM A REALITY CAPTURE ROBOT 1102

DETERMINE, BASED AT LEAST IN PART ON THE LiDAR DATA, A 3D POINT CLOUD OF AN ENVIRONMENT 1104

DETERMINE, BASED AT LEAST IN PART ON THE 3D POINT CLOUD, FIRST COORDINATE POSITIONS OF A STRUCTURE WITHIN THE ENVIRONMENT 1106

1116

DETERMINE A LAYOUT FOR THE ENVIRONMENT 1108

DETERMINE, BASED AT LEAST IN PART ON THE LAYOUT, SECOND COORDINATE POSITIONS OF THE STRUCTURE WITHIN THE ENVIRONMENT 1110

1118

NO

FIRST COORDINATE POSITIONS DIFFERENT THAN SECOND COORDINATE POSITIONS? 1112

YES

GENERATE, BASED AT LEAST IN PART ON THE FIRST COORDINATE POSITIONS, A STATIC MAP OF THE ENVIRONMENT 1114

REALITY CAPTURE ROBOT FOR GENERATING A MAP OF AN ENVIRONMENT

BACKGROUND

Maps are commonly used to understand relationships between objects in space. For example, within a building, a map may indicate a layout of the building, where objects are located, and their relative spacing between one another. In some instances, humans may utilize maps, or in other instances, robotic devices may navigate according to the map. Creating a map is often a tedious and time consuming process, and may be prone to error. In such instances, humans may find the map difficult to use and/or robotic drives may be unable to traverse about the building given inaccuracies within the map. This may lead to injury, damage of the robotic drives, and/or damage to other objects in the building.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 10 illustrates an example process for generating a static map of the environment, according to an embodiment of the present disclosure.

FIG. 11 illustrates an example process for comparing a 3D point cloud of the environment with a layout of the environment to generate a static map of the environment, according to an embodiment of the present disclosure.

DETAILED DESCRIPTION

Figure 1:
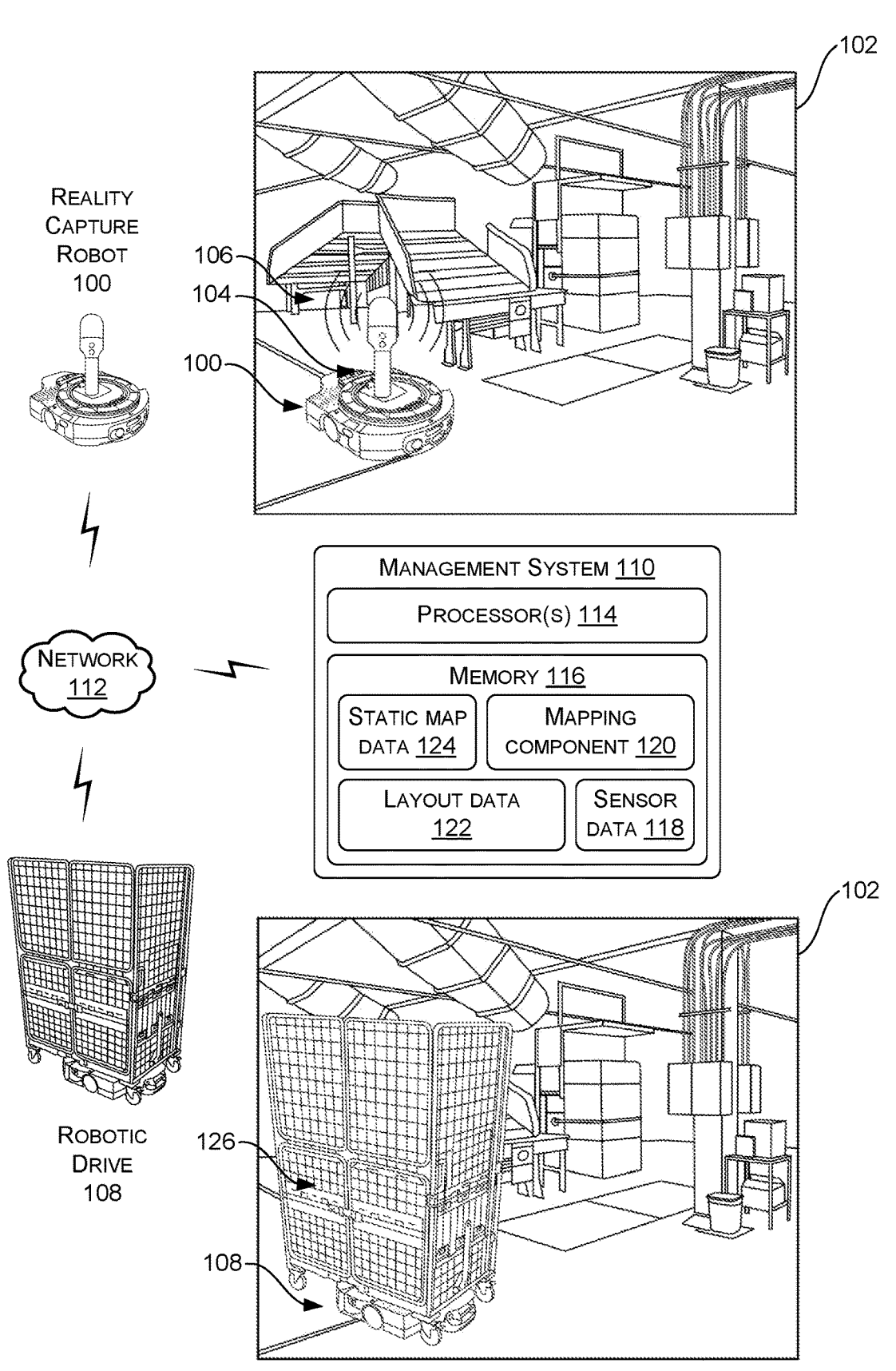
FIG. 1 illustrates an example environment that includes a reality capture robot that scans or images an environment, using one or more LiDAR or three dimensional (3D) imaging sensors, to generate a 3D point cloud or 3D spatial map of the environment, according to an embodiment of the present disclosure. A management system compares the 3D point cloud of the environment to a layout of the environment to determine one or more differences therebetween. Therein, a static map of the environment is generated for use by one or more robotic drives when traversing about the environment.

This application is directed, at least in part, to systems and methods that determine a static map of an environment for use by robotic drives and/or scheduling tasks within the environment. In some instances, the environment may represent a facility, warehouse, or other building in which items are packaged, sorted, or otherwise processed for shipment. As part of this, the robotic drives may traverse about the environment for delivering items, restocking items, or otherwise assisting in the processing of items. To enable the robotic drives to move about the environment, the static map of the environment may be generated. In some instances, the static map represents a three-dimensional (3D) representation of the environment that indicates locations of stations, items, structures, and so forth within the environment. The static map may be generated using a reality capture robot that scans the environment using one or more sensors. For example, the reality capture robot may include LiDAR sensors, or 3D imaging sensors, that scan or image the environment as the reality capture robot moves about the environment. The scan may represent a 3D point cloud, a 3D spatial map, or 3D spatial information of the environment that is compared against a previously generated layout of the environment. Such comparison may indicate discrepancies (e.g., differences) between the layout and the 3D point cloud. The discrepancies are used to generate the static map of the environment. As such, the static map may represent an accurate and up-to-date map of the environment for use in instructing the robotic drives.

The layout, as used herein, may represent a floor plan of the environment, where stations are located, where pillars are located, where doors are located, where conveyor systems are located, and so forth. The layout may be used during building such that the environment is built to the layout. In some instances, the layout may be represented within two-dimensional (2D) and/or 3D space. For example, a 3D layout of the environment may be generated that indicates the locations of respective objects within the environment. In some instances, the layout may be annotated or labeled, for example, to indicate the stations, the pillars, doors, and so forth. However, during building, the layout of the environment may change and the layout may not accurately reflect the locations of things. For example, pillars that support a ceiling or another floor of the building may be placed differently than indicated in the layout. Additionally, in other instances, a layout of the building may change. For example, from time to time, the layout of the building may be reconfigured or otherwise updated. Packing stations, conveyor systems, inventory, and so forth may move from one location to another.

The reality capture robot, or more generally, a first robotic device, is used to scan the environment for obtaining the 3D point cloud that is used to generate the static map. In some instances, the static map indicates the locations of objects within the environment. For example, the static map may indicate where conveyors are located, where pillars are located, where packing stations are located, and so forth. To generate the 3D point cloud, the reality capture robot may include one or more LiDAR sensors. The LiDAR sensors may be mounted in any suitable manner on or to the reality capture robot. For example, the LiDAR sensors may be mounted atop the reality capture robot. An example LiDAR sensor may be the Leica BLK2GO imaging laser scanner. In some instances, the LiDAR sensor may have an accuracy to within, or about, ¾ inches or 19 millimeters. More than one LiDAR sensor may be mounted to the reality capture robot and/or more than one reality capture robot may be used to scan the environment. Moreover, the positioning of the LiDAR sensor may be adjusted, or disposed at various heights above the reality capture robot, to increase a field-of view. The LiDAR sensor may also be configured to scan the environment at a predetermined rate along the route, such as when the reality capture robot moves an inch, two inches, one foot, and so forth.

The reality capture robot is configured to traverse about the environment and in turn, the LiDAR sensors (or scanners) scan and obtain sensor data of the environment. The reality capture robot may represent any suitable robot having drive mechanism(s) for traversing about the environment. For example, the reality capture robot may include track-based or wheel-based drives. As the reality capture robot traverses about the environment, the LiDAR sensors captures the sensor data. In some instances, the LiDAR sensors capture the sensor data at a predetermined interval (e.g., every two seconds, every 0.5 meters, etc.). The sensor data is stitched together to generate the 3D point cloud of the environment. For example, as the reality capture robot travels along a given route in the environment, and captures sensor data, the sensor data may be stitched together to generate the 3D point cloud. The sensor data may be stitched together through identifying common objects within the 3D point cloud, or based on a region of overlap between the sensor data. Upon completion of the given route, or after scanning the environment, the 3D point cloud may be used to generate the static map of the environment.

The 3D point cloud may be used in combination with the layout to generate the static map. In some instances, the 3D point cloud may be imposed, overlaid, or otherwise aligned with the layout. This alignment may be used to compare the respective locations of objects within the environment or as represented within the 3D point cloud and the layout. For example, by aligning the 3D point cloud with the layout, discrepancies between the objects may be determined. That is, by aligning the 3D point cloud with the layout, the environment as represented within the 3D point cloud may be compared against the environment as represented with the layout. This comparison may indicate whether discrepancies exist in the layout and whether objects are located at different locations.

For example, during the comparison, the 3D point cloud may be used to understand that a pillar within the environment is incorrectly located on the layout. In this example, the 3D point cloud may indicate a first location of the pillar (e.g., first X and Y coordinates) while the layout may indicate a second location of the pillar (e.g., second X and Y coordinates). The comparison, for example, may indicate that the pillar is located 0.25 meters away from the location in the layout. This process, however, may repeat as the 3D point cloud and the layout are compared to determine any and all discrepancies. In some instances, the discrepancies may be filtered based on an amount of change. For example, if the locations of the objects are off by less than a threshold amount (e.g., 0.001 meters), discrepancies may not exist. The level of granularity, however, may be dynamically adjusted depending on the accuracy required or the specific implementation.

In some instances, the layout is used to annotate, label, or otherwise classify objects within the 3D point cloud. For example, by aligning the 3D point cloud with the layout, objects within the 3D point cloud may be classified. This may include classifying those objects detected in the 3D point cloud, for example, which correspond to pillars, conveyor systems, shelving, packing stations, and so forth. The layout may therefore increase a confidence of the detected objects within the 3D point cloud and ensure that like objects in the 3D point cloud are being compared to like objects in the layout, vice versa. In other words, using the layout and by aligning the 3D point cloud with the layout, the systems and methods are able to understand and classify those objects within the 3D point cloud. The alignment may also provide detailed information about the objects within the environment, such as an identifier of the picking station, packaging station, and so forth.

Additionally, or alternatively, to classify objects in the 3D point cloud, machine-learned model(s) may be used. The machine-learned model(s), for example, may receive the 3D point cloud as an input and output classifiers of the objects. The machine-learned model(s) may be trained to analyze shapes, boundaries, sizes, depth, and so forth of the objects within the 3D point cloud (or the sensor data) to understand those objects that correspond to pillars, conveyor systems, packing stations, and so forth. The classification of the objects within the 3D point cloud assists in generating the static map, and ultimately, creating the static map that is usable by the robotic drives and/or operators to understand where objects are located within the environment. In some instances, the machine-learned model(s) may involve comparing the 3D point cloud, or objects within the 3D point cloud, to a library of objects stored in a database. This may, for example, assist in determining the object represented within the 3D point cloud. As an example, comparison of objects within the 3D point cloud to the library of objects may indicate whether the objects within the 3D point cloud are chutes, pillars, a sorting station, picking station, and so forth.

In some instances, the static map may indicate those objects that are static in the environment. For example, it is envisioned that during scanning of the environment, the 3D point cloud may indicate objects in the environment that are mobile. These example objects may include humans, pallets, boxes, other robotic drives, and so forth. In other words, these objects may not have a static location within the environment but may be constantly moving. In some instances, these objects are filtered out from the static map, or are filtered out when generating the static map. As such, in some instances, the static map may represent structural elements, foundational components, or objects that are not dynamically moving. Different objects in the static map may also be identified with different colors, outlines, and so forth. For example, structural elements, such as pillars, may include a first color (e.g., yellow), while packing stations may be indicated in a second color (e.g., blue). Although referred to as a static map, the static map may generally represent a map of the environment using the 3D point cloud.

In some instances, the reality capture robot may additionally or alternatively include other 3D imaging sensors that capture information of the environment. For example, cameras, depth sensors, or other stereo 3D sensors, structured light sensors, time of flight sensors, and so forth, may be used for obtaining 3D spatial information of the environment. In such instances, the output of the 3D imaging sensors may represent a 3D spatial map of the environment, which is used to determine where objects are located within the environment.

After generating the static map, the static map may be used by the robotic drives, or more generally, second robotic devices, that maneuver about the environment. For example, the static map may be provided to the robotic drives for use in localizing themselves within the environment and for understanding how to maneuver about the environment. For example, using the static map, the robotic drives may understand how to navigate within the environment, how to travel to certain locations with the environment, and so forth. Through this, the robotic drives may avoid contacting objects within the environment given that the objects are accurately represented within the static map. Additionally, the robotic drives may include onboard sensor(s) that assist in maneuvering about the environment.

In some instances, the reality capture robot may be operate autonomously to scan the environment and/or may be remotely controlled. In the former, the reality capture robot may include imaging sensors (e.g., cameras) that image fiducials or other markers disposed about the environment (e.g., on the floor). By imaging the fiducials, the reality capture robot may traverse about the environment, along a predetermined route, for scanning the environment. In some instances, the route may be predetermined by one or more operators. In instances where the reality capture robot is remotely controlled, one or more operators may guide the reality capture robot throughout the environment. This may be accomplished, for example, using a joystick or other input devices.

In some instances, the reality capture robot may scan a particular region of the environment or may scan an entirety of the environment. For example, from time to time, a configuration of the environment may change. This may impact a location of stations (e.g., packing, picking, etc.), structural elements (e.g., shelving), and so forth. With the change in configuration, the reality capture robot may be instructed (or controlled) to scan a particular region for use in updating the corresponding portion of the static map. In other scenarios, when commissioning a building or when facility-level configurations are changed, the reality capture robot may scan an entirety of the environment. Additionally, more than one reality capture robot may be used to scan an environment, and thereafter, the sensor data from the two reality capture robots may be combined to form the 3D point cloud. A first reality capture robot may scan a first portion of an environment, and a second reality capture robot may scan a second portion of the environment. In such instances, the scans may or may not be combined, however, the scans may be used to generate a 3D point cloud that represents at least a portion of the environment.

In some instances, the reality capture robot communicatively couples to a management system that processes and analyzes the 3D point cloud. For example, the management system may compare the layout and the 3D point cloud to generate the static map. The reality capture robot may upload in real-time while scanning the environment the 3D point cloud (or the raw sensor data) to the management system. Alternatively, the reality capture robot may upload the 3D point cloud (or the raw sensor data) after scanning the environment. Regardless of how the management system receives the 3D point cloud, the management system may generate the static map and then send the static map (or portions thereof) to the robotic drives for use when moving about the environment.

Although discussed herein as finding use in environments in which items are sorted, packaged, or otherwise processed for shipment, the systems and methods described herein may extend to other environments or applications. For example, the reality capture robot may generally scan an environment for use in generating the static map. Therein, the static map may be used for modeling the environment. Any suitable environment is envisioned, including medical, educational, governmental, or industrial facilities, for example.

In some instances, the static map may be used to virtually simulate operations within the environment. For example, by having a representation of the environment, the static map may be used to simulate how robotic drives, personnel, and so forth operate or move within the environment. Different simulations, for example, may indicate an operational efficiency within the environment. The management system, or another device, may simulate different numbers of robotic drives (e.g., forty, sixty, one hundred, etc.) in the environment and using the static map. Here, the simulation may include the robotic drives performing respective tasks. Such simulation, for example, may indicate whether the environment becomes too crowded, is underutilized, and may also indicate whether a throughput or operational efficiency with the environment is positively or negatively impacted.

In light of the above, the systems and methods described herein utilize LiDAR sensors for generating a 3D point cloud that represents as-built conditions of the environment. The 3D point cloud is compared to a layout of the environment to annotate the 3D point cloud as well as determine whether discrepancies exist. For example, comparison between the 3D point cloud and the layout may be used to determine whether the layout accurately represents the environment. Using the 3D point cloud and the layout, a static map is generated. The static map is used to understand the layout of the environment and for instructing robotic drives. By automating the process of scanning an environment, less resources are utilized and errors are reduced.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a reality capture robot 100 traveling within an environment 102. In some instances, the environment 102 represents a site, building, warehouse, or other facility in which packages are sorted or otherwise fulfilled, processed, and/or categorized for shipment. For example, the environment 102 may represent a distribution center, warehouse, cross-docking station, or other facility in which the packages are fulfilled, processed, sorted, and/or categorized for shipment.

Although not shown, the environment 102 may include inventory for shipment. Generally, the inventory stores an inventory of items (e.g., clothing, electronics, toys, household goods, etc.). In some instances, the items may be stored in bins, slots, shelves, containers, crates, stalls, racks, etc. The inventory may be dispersed about the environment 102 and/or may be located in dedicated areas of the environment 102 (e.g., perimeter). Additionally, or alternatively, in some instances, the inventory may be located separate from the environment 102. In this sense, the environment 102 may not include the inventory, such as in a cross-docking station. Here, the environment 102 may receive previously packaged items for further sortation and/or delivery to a variety of destinations.

The reality capture robot 100 is shown traversing through a portion (area, region, zone, etc.) of the environment 102. In some instances, the portion of the environment 102 may represent sortation area in which packages are sorted onto or into container(s), bin(s), or other cart(s). The packages may arrive at the sortation area via conveyor systems, chutes, and the like disposed throughout the environment 102. However, the reality capture robot 100 may traverse through other portions of environment 102. In some instances, the reality capture robot 100 may travel within a specified or designated region of the environment 102, or may traverse an entirety of the of the environment 102 (e.g., within a perimeter or walls of the environment 102). Regardless, while the reality capture robot 100 traverses through the environment 102, the reality capture robot 100 scans the environment 102 using a LiDAR sensor 104. In some instances, the LiDAR sensor 104 may mount atop the reality capture robot 100.

The LiDAR sensor 104 emits signals 106 as the reality capture robot 100 traverses about the environment 102. For example, as the reality capture robot 100 travels about the environment 102, the LiDAR sensor 104 emits the signals 106 (e.g., light). The signals 106 bounce off surrounding objects in the environment 102 and return to the LiDAR sensor 104. The LiDAR sensor 104 determines the time it took for each signal 106 to return to the LiDAR sensor 104 to calculate the distance that the signals 106 traveled. This process repeats to capture data associated with the environment 102. Ultimately, using the data captured by the LiDAR sensor 104, a 3D representation of the environment 102 is generated. In some instances, and as will be explained herein, the 3D representation of the environment 102 is used by robotic drives 108 when traversing about the environment 102. In this sense, at a first instance, the reality capture robot 100 may scan the environment 102, and at a second instance that is after the first instances, the robotic drives 108 may utilize the scan of the environment 102 when traversing about the environment 102.

The reality capture robot 100 is shown communicatively coupling to a management system 110 via a network 112. The management system 110 is shown including processor(s) 114 and memory 116, where the processor(s) 114 may perform various functions and operations associated with generating the 3D representation of the environment 102, and the memory 116 may store instructions executable by the processor(s) 114 to perform the operations described herein. For example, the management system 110 may receive sensor data 118 generated by the LiDAR sensor 104. In some instances, the sensor data 118 may be received on a real-time or continuous basis as the reality capture robot 100 traverses about the environment 102. In other instances, after the reality capture robot 100 performs a scan of the environment 102 (or a portion thereof), the reality capture robot 100 may send the sensor data 118 to the management system 110. Regardless of when the sensor data 118 is received, the sensor data 118 is representative of a 3D scan of the environment 102.

In some instances, the sensor data 118 may be stitched together, whether via the LiDAR sensor 104, components of the reality capture robot 100, and/or components of the management system 110, to generate a 3D point cloud of the environment 102. For example, as the reality capture robot 100 traverses about the environment 102, the sensor data 118 overlaps with existing sensor data 118. That is, the sensor data 118 generated at different points in time, as the reality capture robot 100 moves about the environment 102, may represent common objects in the environment 102. Here, the sensor data 118 may be stitched together to generate the 3D representation of the environment 102. Stitching the sensor data 118 together may involve two stitched images that have some overlap. In some instances, the sensor data 118 may be considered a 3D point cloud that represents a map of points in space. The 3D point cloud, for example, may be generated by stitching the sensor data 118 together.

Although described herein as scanning the environment using the LiDAR sensor 104, the reality capture robot 100 may be equipped with 3D imaging sensors that image the environment. In such instances, the 3D imaging sensors may generate 3D spatial information or a 3D spatial map that depicts the objects in the environment 102. The 3D spatial information and/or the 3D spatial map may be used in a similar manner as the 3D point cloud to determine the static map of the environment.

The management system 110 is shown including a mapping component 120 that generates a static map of the environment 102. The mapping component 120, for example, may receive the sensor data 118 and compare the sensor data 118 to layout data 122. The layout data 122 may indicate or be representative of a layout, configuration, or location of entities or objects within the environment 102. Example objects, by way of non-limiting examples, include structural elements of the environment 102 (e.g., pillars that support a ceiling or overhead floors, walls, doors, etc.), shelving, stations of the environment (e.g., packing stations in which items are packaged for shipment, picking stations in which items are picked from inventory, sortation areas in which packages or items are sorted for shipment, outbound stations in which packages (or carts) are placed for shipment, etc.), conveyance systems (e.g., conveyor, chutes, rollers, etc.), mechanical equipment (e.g., chillers, water lines, etc.), and so forth. Here, the layout data 122 may be used to understand the layout of the environment 102, where the objects are located, and what parts of the environment 102 represent. The layout may be used during building of the environment 102 such that the environment 102 is built to the layout. In some instances, the layout data 122 may represent the environment 102 in two-dimensional (2D) and/or 3D space. The layout data 122 may be updated from time to time as layouts or configurations of the environment 102 change.

The mapping component 120, for example, may overlay, impose, or otherwise align the sensor data 118 with the layout data 122. In some instances, aligning the 3D point cloud represented within the sensor data 118 and the layout may include aligning known objects within the 3D point cloud and the layout. For example, walls or a perimeter of the environment 102 within the 3D point cloud may be aligned with walls or a perimeter of the environment 102 in the layout. In other instances, reference points or objects within the 3D point cloud and the layout may be aligned for comparing the 3D point cloud and the layout.

The alignment may be used to compare the respective locations of objects within the environment 102. For example, by aligning the 3D point cloud (as represented within the sensor data 118) with the layout (as represented within the layout data 122), discrepancies of the objects may be determined. During such comparison, the mapping component 120 may determine that a pillar represented within the layout is incorrectly located. That is, the sensor data 118 may indicate a different location of the pillar than determined using the layout data 122. Here, because the sensor data 118 may indicate another location of the pillar, the comparison may yield that a discrepancy exists between the layout and the 3D point cloud. The comparison, for example, may indicate that the pillar is located 0.25 meters away from the location in the layout. This process, however, may repeat as the 3D point cloud and the layout are compared to determine any and all discrepancies between objects in the environment 102. This process may aid in obtaining an accurate representation of the environment 102.

Additionally, aligning the layout and the 3D point cloud may be used to annotate, label, or otherwise classify objects within the sensor data 118. For example, by aligning the 3D point cloud with the layout, objects may be classified within the 3D point cloud. This may include classifying those objects detected in the 3D point cloud, for example, that correspond to pillars, conveyor systems, shelving, packing stations, and so forth. In this sense, the layout may be used to understand the 3D point cloud and what objects are represented within the 3D point cloud. Using the layout and aligning the 3D point cloud therefore serves to understand and classify those objects within the 3D point cloud. In such instances, the classification of the objects may be used when comparing the 3D point cloud with the layout to ensure that like objects are being compared to one another. The alignment may also be used to determine identifiers (e.g., station type, station number, etc.) of the objects in the environment 102.

Additionally, or alternatively, as will be discussed herein, machine-learned model(s) may be used to classify the objects within the environment 102. The machine-learned model(s), for example, may receive the sensor data 118 as an input and output classifiers of the objects. The machine-learned model(s) may be previously trained to analyze shapes, boundaries, sizes, and so forth of the objects within the sensor data 118 to understand the objects represented within the sensor data 118. Therein, the machine-learned model(s) may attached labels to the objects. In some instances, the machine-learned model(s) may be trained to compare those objects depicted in the sensor data 118 against a library of objects to determine objects that are present. For example, the library of objects may include representations of pillars, picking stations, chutes, pallets, conveyor systems, and so forth. Comparison of the sensor data 118 to the library of objects may indicate, or be used to identify, those objects that are depicted in the sensor data 118. In such instances, the static map data 124 may be determined with or without alignment of the 3D point cloud to the layout data 122.

Classifying the objects within the 3D point cloud, as well as determining the discrepancies between the 3D point cloud and the layout, is used to create static map data 124 of the environment 102. The static map data 124 may represent a static map of the environment 102. In some instances, the static map may indicate those objects that are static in the environment 102. For example, it is envisioned that during scanning of the environment 102, the 3D point cloud may indicate objects in the environment 102 that are mobile, such as humans, the robotic drives 108, boxes, and so forth. In other words, these objects may not have a static location within the environment 102 but may be moving within the environment 102 between locations. As such, in some instances, the static map may represent static objects in the environment 102. In some instances, the static objects may represent objects that are permanently or semi-permanently fixed at a particular location within the environment. Additionally, or alternatively, the static objects may be considered static if they have remained in the same location for a threshold amount of time.

In some instances, the mobile objects are filtered out from the static map, or are filtered out when generating the static map. For example, if the mobile objects move from one location to another across the sensor data 118, or as the LiDAR sensor 104 captures the sensor data 118 at different points in time, objects may include dynamic locations. In some instances, the mobile objects may be determined using object detection techniques, for example, that are configured to classify the objects within the sensor data 118. For example, wheels of carts, robots, and so forth may be detected for determining that the objects are mobile. In other instances, legs, arms, or other body parts may be detected for classifying a human. These and other techniques are accordingly arranged to determine the existence of the mobile objects, and as a result, filter those out from the static map.

In some instances, the static map is a 2D and/or 3D map. The 2D and/or 3D maps may be used to visualize and determine where objects reside within the environment 102. Such maps, for example, may be used when servicing or performing maintenance within the environment 102, to understand usable space within the environment 102 (e.g., for retrofitting), and so forth. Additionally, the static map may be used by the robotic drives 108 to maneuver about the environment 102. For example, the static map may be provided to the robotic drives 108 for use by the robotic drives 108 in localizing themselves within the environment 102 and for understanding how to maneuver about the environment 102 between locations. For example, using the static map, the robotic drives 108 may understand how to navigate within the environment 102, how to travel to certain locations with the environment 102, and so forth. Through this, the robotic drives may avoid contacting objects within the environment 102 given that the objects are accurately represented within the static map.

For example, after generating the static map, at a subsequent instance in time, the robotic drive 108 may be transporting a cart 126 within the environment 102. While the robotic drive 108 is transporting the cart 126, the robotic drive 108 may access or utilize the static map. This may allow the robotic drive 108 to accurately travel within the environment 102 to certain stations, locations, and so forth. The robotic drive 108 may include other sensors, such as sensors that image fiducials on a floor of the environment 102. In some instances, the management system 110 may control or otherwise instruct the robotic drive 108 as to the locations within the environment 102 that the robotic drive 108 is to travel. In some instances, the static map may be used to determine the location of objects within the environment 102, and as a result, the management system 110 may determine pathways between the objects in which the robotic drives 108 may traverse.

In some instances, the reality capture robot 100 may operate autonomously for scanning the environment 102 or may be remotely controlled. In the former, the reality capture robot 100 may include imaging sensors (e.g., cameras) that image fiducials or other markers disposed about the environment 102 (e.g., on the floor). By imaging the fiducials, the reality capture robot 100 may traverse about the environment 102, along a predetermined route, for scanning the environment 102. Here, in some instances, the reality capture robot 100 may traverse about the environment 102 using the layout data 122 (e.g., prior to the static map being generated). Additionally, or alternatively, in instances where the reality capture robot 100 is remotely controlled by one or more operators that guide the reality capture robot 100 throughout the environment 102. This may be accomplished, for example, using a joystick or other input device.

Although discussed herein as finding use in environments in which items are sorted, packaged, or otherwise processed for shipment, the reality capture robot 100 may be implemented in other applications and/or environments. For example, generally, the reality capture robot 100 may be used to scan any given site, environment, building and so forth. Scanning may generate the 3D point cloud that is used to determine maps. In such instances, the 3D point cloud may be compared against existing layouts, or the 3D point cloud may be solely used to generate the maps.

In some instances, the management system 110 may be located within the environment 102 and/or remote from the environment 102. The management system 110 may be implemented as one or more servers and may, in some instances, form a portion of a network-accessible computing platform implemented as a computing infrastructure of processors, storage, software, data access, etc. that is maintained and accessible via a network such as the Internet. Common expressions associated with the management system 110 include "on-demand computing", "software as a service (SaaS)", "platform computing", "network-accessible platform", "cloud services", "data centers", etc.

The network(s) 112 may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The reality capture robot 100, the management system 110, and the robotic drive 108 include suitable components, interfaces, and the like for communicating over the network(s) 112.

As such, FIG. 1 illustrates an example scenario of generating a 3D map of the environment 102 using the reality capture robot 100. The 3D map, such as the static map, is used by the robotic drives and/or operators within the environment 102 to understand where objects are located. In some instances, more than one reality capture robot may be used to scan the environment 102, and thereafter, the sensor data from the one or more reality capture robots may be combined to generate the 3D point cloud.

Figure 2:
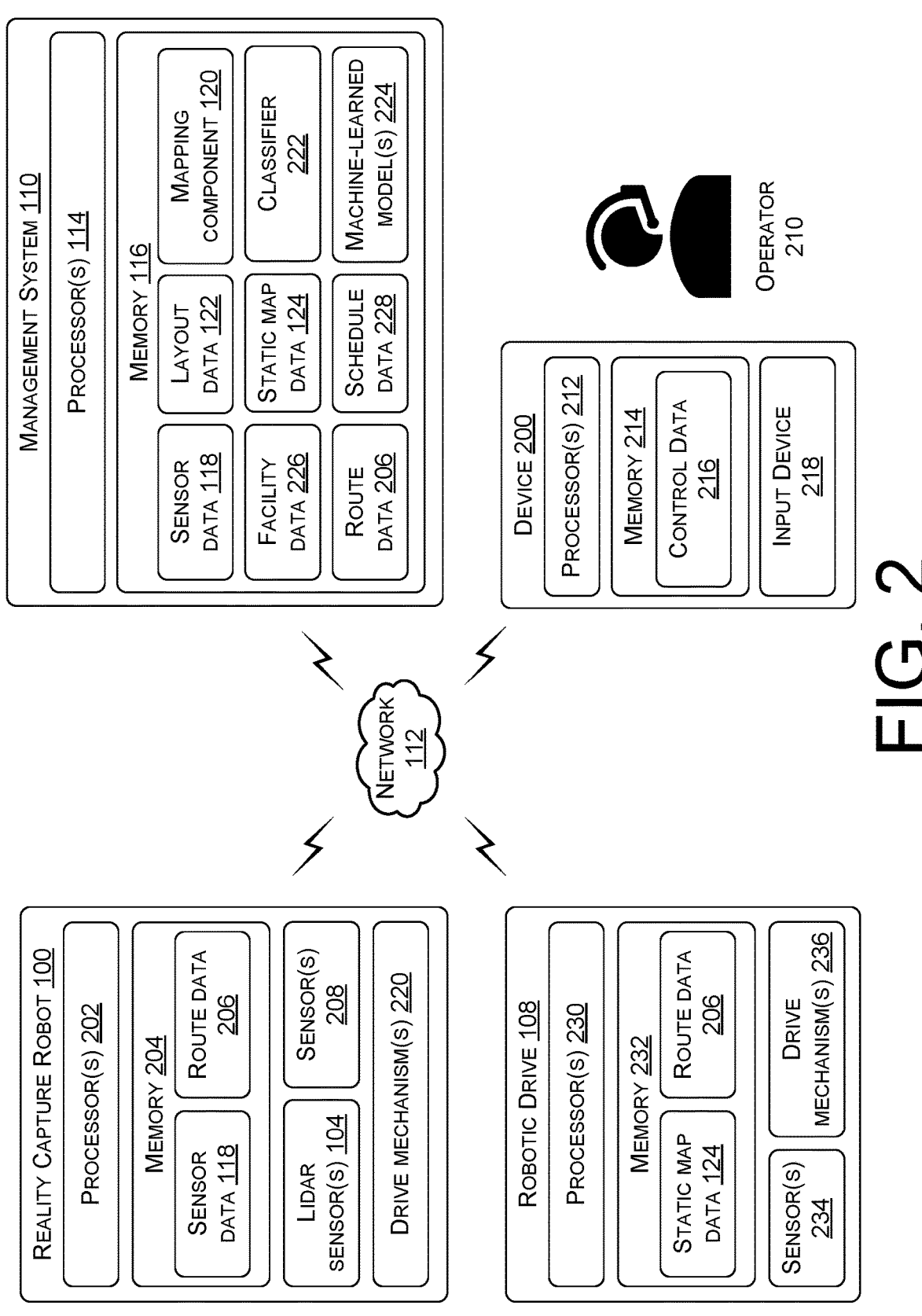
FIG. 2 illustrate select components of the reality capture robot, the management system, and the robotic drives of FIG. 1, as well as a device that may be used for controlling the reality capture robot, according to an embodiment of the present disclosure.

FIG. 2 illustrates select components of the reality capture robot 100, the robotic drive 108, the management system 110, and a device 200. Each of the reality capture robot 100, the robotic drive 108, the management system 110, and the device 200 may communicatively couple to one another via the network(s) 112.

The reality capture robot 100 may represent any suitable robotic device that is configured to traverse about the environment 102. The reality capture robot 100 includes processor(s) 202 and memory 204, where the processor(s)

202 may perform various functions and operations associated with scanning the environment 102, and the memory 204 may store instructions executable by the processor(s) 202 to perform the operations described herein. The reality capture robot 100 includes the LiDAR sensor 104 for scanning the environment 102. The LiDAR sensor 104 may be mounted atop (e.g., on top of) the reality capture robot 100, using suitable brackets, frames, and so forth. Such positioning may increase a field of view of the LiDAR sensor 104 when scanning the environment 102. In some instances, the LiDAR sensor 104 may be disposed on a pole, shaft, or other vertical structure that disposes the LiDAR sensor 104 vertically above the reality capture robot 100. In some instances, the vertical position of the LiDAR sensor 104 may be adjusted such that a position of the LiDAR sensor 104 above a ground surface in the environment 102 is variable. For example, while traveling about the environment 102, the LiDAR sensor 104 may telescopically extend up and down.

In some instances, the LiDAR sensor 104 represents any suitable LiDAR sensor 104 capable of being mounted to the reality capture robot 100. An example LiDAR sensor 104 may include the Leica BLK2GO imaging laser scanner. In some instances, the LiDAR sensor 104 may have an accuracy to within, or about, ¾ inches or 19 millimeters. The LiDAR sensor 104 may have a horizontal field of view of approximately 150 degrees and/or a vertical field of view of approximately 150 degrees. Additionally, the reality capture robot 100 may include more than one LiDAR sensor 104.

The LiDAR sensor 104 generates the sensor data 118 as the reality capture robot 100 traverses about the environment 102. For example, as the reality capture robot 100 moves about the environment 102, and the signals 106 are emitted by the LiDAR sensor 104, the LiDAR sensor 104 may generate the sensor data 118. In some instances, the LiDAR sensor 104 generates the sensor data 118 at a predetermined interval or continuously while the reality capture robot 100 moves about the environment 102. For example, the LiDAR sensor 104 be configured to scan the environment 102 when the reality capture robot 100 moves an inch, two inches, one foot, and so forth. The sensor data 118 is indicative of the time it took for each signal 106 to return to the LiDAR sensor 104. In some instances, the LiDAR sensor 104, the reality capture robot 100, the management system 110, or other computing devices calculate the distance that the signals 106 traveled. As discussed herein, such distance is used for mapping the environment 102 to obtain the static map of the environment 102.

The sensor data 118 is shown being stored in the memory 204 of the reality capture robot 100. As the reality capture robot 100 moves about the environment 102, the memory 204 may store the sensor data 118. Therein, after the reality capture robot 100 completes a scan of the environment 102, the reality capture robot 100 may send the sensor data 118 to the management system 110. However, in some instances, the reality capture robot 100 may send (e.g., transmit, upload, etc.) the sensor data 118 to the management system 110 (or other devices) on a real-time or continuous basis as the reality capture robot 100 moves about the environment 102.

The memory 204 is shown storing route data 206 that corresponds to a route within the environment 102 that the reality capture robot 100 traverses. For example, during a scan of the environment 102, or a portion of the environment 102, the reality capture robot 100 may travel along the route. In some instances, the reality capture robot 100 operates autonomously along the route. The route may indicate a path or course that the reality capture robot 100 is to take when scanning the environment 102. In some instances, the route data 206 may indicate how fast the reality capture robot 100 is to travel while scanning, when the reality capture robot 100 is to slow down or pause when scanning certain regions, where the reality capture robot 100 is to turn, and so forth. In some instances, and as will be discussed in further detail herein, the route data 206 may be generated by the management system 110 and then transmitted to the reality capture robot 100.

The reality capture robot 100 is shown including sensor(s) 208. The sensor(s) 208 may assist the reality capture robot 100 in traversing about the environment 102, whether autonomously or semi-autonomously. For example, while the reality capture robot 100 is traveling about the environment 102, the sensor(s) 208 may help guide the reality capture robot 100 about the environment 102. In some instances, the sensor(s) 208 may include imaging sensor(s), camera(s), proximity sensor(s), location sensor(s), speed sensor(s), accelerometer(s), and so forth. In some instances, the sensor(s) 208 may include imaging sensor(s) that image fiducials or other marker(s) disposed about the environment 102. The marker(s) may be disposed on a floor, for example, of the environment 102. The imaging sensor(s) may image the marker(s) for localizing the reality capture robot 100 within the environment 102. This may, for example, assist the reality capture robot 100 traveling about the environment 102. In these instances, the sensor(s) 208 may generate sensor data 118 that is processed and/or analyzed to travel about the environment 102.

In some instances, the reality capture robot 100 may be controlled or remotely operated by an operator 210. The operator 210, for example, may interact with the device 200 to control the reality capture robot 100. The device 200 is shown including processor(s) 212 and memory 214, where the processor(s) 212 may perform various functions and operations associated controlling the reality capture robot 100 within the environment 102, and the memory 214 may store instructions executable by the processor(s) 212 to perform the operations described herein. For example, the device 200 may include an input device 218, such as a joystick, that is operable by the operator 210. Using the joystick, for example, the operator 210 may steer the reality capture robot 100 within the environment 102. As the operator 210 engages with the input device 218, the input device 218 may generate control data 216 that is used to steer the reality capture robot 100. The control data 216, for example, may represent when the operator 210 steers left, steers right, steers forward, and so forth. The control data 216 may also indicate a speed at which the reality capture robot 100 is being directed within the environment 102.

In some instances, the operator 210 may utilize the sensor(s) 208 of the reality capture robot 100 when remotely controlling the reality capture robot 100. For example, image or video data generated by a camera of the reality capture robot 100 may be presented to the operator 210 (e.g., via a display). This image or video data may assist the operator 210 in controlling the reality capture robot 100 and knowing where to steer the reality capture robot 100. Additionally, or alternatively, the operator 210 may have access to a location of the reality capture robot 100 within the environment 102 (e.g., via an onboard location sensor) or sensor(s) disposed about the environment 102 may track a location of the reality capture robot 100. Regardless, in some instances, the location of the reality capture robot 100 may be used by the operator 210 for steering the reality capture robot 100 about the environment 102. In some instances, the operator 210 may be located remotely from the environment 102 or within the environment 102.

The reality capture robot 100 is shown including drive mechanism(s) 220 that propel the reality capture robot 100 about the environment 102. The drive mechanism(s) 220 may represent tracks, wheels, articulating members, or other suitable members that propel the reality capture robot 100. The drive mechanism(s) 220 are operably coupled to power source(s) (e.g., batteries), drive trains, gears, and so forth. The drive mechanism(s) 220 may be independently operable to steer the reality capture robot 100 within the environment 102.

As introduced above, the management system 110 includes the processor(s) 114 and the memory 116, where the memory 116 stores the sensor data 118 as received from the reality capture robot 100, the layout data 122, and the static map data 124. The sensor data 118 represents LiDAR data generated by the LiDAR sensor 104 of the reality capture robot 100. In some instances, the sensor data 118 represents raw or unprocessed sensor data received from the reality capture robot 100. In some instances, management system 110 may stitch together the sensor data 118 to generate a 3D point cloud of the environment 102. For example, using the sensor data 118 captured at different points in time as the reality capture robot 100 traverses about the environment 102, the management system 110 may stitch together the sensor data 118 representative of the 3D point cloud. In other instances, the reality capture robot 100 may stitch together the sensor data 118 and generate the 3D point cloud. In this sense, it is to be understood that the sensor data 118 may represent the 3D point cloud of the environment 102, or the scans as captured and generated by the reality capture robot 100. Additionally, the management system 110 may receive the sensor data 118 continuously as the reality capture robot 100 scans the environment 102, or after the reality capture robot 100 completes a scan of the environment.

The layout data 122 is representative of a layout of the environment 102, including for example, where objects are located within the environment 102 and what the objects represent. The layout data 122 may indicate distances between the objects, how big the objects are (e.g., width, height, length), and so forth. Here, the layout data 122 may be representative of a blueprint, for example, of the environment 102. The layout data 122 may indicate a 2D or 3D representation of the environment 102. In some instance, personnel may engage with the layout data 122 for manipulating the layout data 122 and viewing different portions of the environment 102. For example, the layout data 122 may be presentable on a display, and using a cursor, an operator may view different parts of the environment 102. This may allow for the visualization of the environment 102 in 3D space. However, the environment 102 may also be viewed in 2D space. The layout data 122 may also include labels on the objects within the environment 102. Such labels, for example, may indicate conveyors, walls, pillars, picking stations, packing stations, outbound areas, and so forth. These labels may assist personnel in understanding portions of the environment 102, where certain things or entities are located, and so forth.

The static map data 124, as noted above, represents the static map of the environment 102. The static map data 124 is generated via the management system 110 using the sensor data 118 and the layout data 122. For example, the mapping component 120 that may generate the static map data 124. In some instances, the mapping component 120 aligns the sensor data 118 and the layout data 122 for generating the static map data 124. For example, the mapping component 120 may impose, overlay, or otherwise align the sensor data 118 and the layout data 122. This alignment may be used to compare the respective locations of objects within the environment 102. For example, by aligning the sensor data 118 (e.g., the 3D point cloud) with the layout data 122, discrepancies of the objects within the environment 102 may be determined. In this sense, the sensor data 118 may be used to correct inaccuracies in the layout data 122 for generating the static map data 124.

Additionally, by aligning the sensor data 118 and the layout data 122, objects within the sensor data 118 may be annotated or otherwise classified. For example, the management system 110 is shown including a classifier 222. In some instances, the classifier 222 uses the label(s) within the layout data 122 to understand the objects represented within the sensor data 118. For example, if the layout data 122 indicates a location of a conveyor, or labels an object corresponding to the conveyor, the classifier 222 may use this label to understand that an object within the sensor data 118 corresponds to the conveyor. In some instances, the layout data 122 may increase a confidence of the objects detected within the sensor data 118 and identify those objects detected in the sensor data 118. As such, using the layout data 122, and the classifiers including therein, by aligning the sensor data 118 with the layout data 122, the classifier 222 may be able to understand and classify those objects within the sensor data 118 for use in generating the static map data 124.

Additionally, or alternatively, in some instances, the classifier 222 may utilize machine-learned model(s) 224 that are trained to identify objects within the sensor data 118. For example, the machine-learned model(s) 224 may receive the sensor data 118 as an input and output, a classifier of the objects. In this sense, the machine-learned model(s) 224 are trained to identify objects within the sensor data 118. In some instances, the machine-learned model(s) 224 may place bounding boxes around objects within the sensor data 118 for classifying such objects. The machine-learned model(s) 224 may be previously trained to classify the objects within the sensor data 118 using training data, to identify certain shapes, sizes, locations, contours, and so forth of the objects within the environment 102. As such, during a later instance, the machine-learned model(s) 224 may recognize those objects within the environment 102 for purposes of understanding those objects depicted in the sensor data 118.

Machine learning generally involves processing a set of examples (called "training data") in order to train a machine learning model(s). A machine learning model(s), once trained, is a learned mechanism that may receive new data as input and estimate or predict a result as output. For example, a trained machine learning model may comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model may be trained to infer a probability, or a set of probabilities, for a classification task based on unknown data received as input. In the context of the present disclosure, the unknown input may be the sensor data 118, and the machine-learned model(s) 224 may be tasked with outputting the confidence scores that indicates, or otherwise relates to, a score, confidence, or probability of the objects within the sensor data

118 corresponding to a pillar, a robot, a box, a shelf, a person, conveyors, picking stations, packing stations, and so forth.

Training data that is used to train machine-learned model(s) 224 may include various types of data. In general, training data for machine learning may include two components, features and labels. However, in some instances, the training data used to train the machine-learned model(s) 224 may be unlabeled. Accordingly, the machine-learned model(s) 224 may be trainable using any suitable learning technique, such as supervised learning, unsupervised learning, semi-supervised learning, reinforcement learning, and so on. The features included in the training data may be represented by a set of features, such as in the form of an n-dimensional feature vector of quantifiable information about an attribute of the training data. The following is a list of example features that may be included in the training data for training the machine-learned model(s) 224 described herein. However, it is to be appreciated that the following list of features is non-exhaustive, and features used in training may include additional features not described herein, and, in some cases, some, but not all, of the features listed herein. Example features included in the training data may include, without limitation, a width of the objects, a height of the objects, a length of the objects, a shape of the objects, a location of the objects within the environment 102, the coupling of the objects to other objects in the environment 102, a position of the objects on a floor of the environment 102, a directionality or orientation of the objects, and so forth.

Once the static map is generated, the management system 110 may use this static map for understanding the locations, orientations, positions, and so forth of the objects within the environment 102. In some instances, the static map represents a 2D or 3D depiction of the environment 102. The static map may also be viewable to understand a configuration of the environment 102, where objects are located, what objects are, and so forth. In this sense, the static map may be representative of a 3D map of the environment 102 that is usable by personnel as well as the robotic drives 108 to understand specifics of the environment 102. As a brief example, to know the distance between two pillars within the environment 102, the static map may be accessed. Here, engaging with the static map, scrolling through the static map, or maneuvering within the static map may be used to understand specifics of the environment 102.

In some instances, the static map may indicate those objects that are static in the environment 102. For example, it is envisioned that during scanning of the environment 102, the sensor data 118 may capture objects in the environment that are mobile. These example objects may include humans, pallets, boxes, other robotic drives, and so forth. In other words, these objects may not have a static location within the environment 102 but may be constantly moving. In some instances, these objects are filtered out from the static map, or are filtered out when generating the static map. As such, in some instances, the static map may represent structural elements within the environment 102, such as frames, brackets, supports, and the like that are structural and foundational. In some instances, different objects in the static map may also be identified with different colors, outlines, and so forth. For example, structural elements, such as pillars, may include a first color (e.g., yellow), while packing stations may be indicated in a second color (e.g., blue).

The memory 116 is further shown storing facility data 226. In some instances, the facility data 226 is associated with the environment 102, and indicates a location of the environment 102, a size of the environment 102, operations performed within the environment 102, inventory of the environment 102, and so forth. In some instances, the sensor data 118, the layout data 122, and/or the static map data 124 is associated with a specific environment, within the facility data 226. In this sense, the management system 110 may be configured to store information associated with respective environments 102, for generating static map data 124 for a plurality of environments 102.

The management system 110 may generate the route data 206 for the reality capture robot 100 to use when scanning the environment 102. In some instances, the management system 110 utilizes the layout data 122 when determining the route data 206. For example, as the layout data 122 may include a layout of the environment 102, such as where walls, pillars, structures, and so forth are located, this information may be used to generate the route. Although the exact location of the walls, pillars, structures, and so forth may be slightly different in reality than indicated in the layout, the layout data 122 may still be used to generate the route data 206. In other words, the layout data 122 may be sufficient enough for generating the route data 206, and later, the static map data 124 may more precisely indicate the exact locations of the walls, pillars, structures, and so forth of the environment 102. However, at the initial instances of scanning the environment 102, the layout data 122 may represent an approximation of the environment 102. Still, as discussed above, the reality capture robot 100 may include the sensor(s) 208 for navigating within the environment 102 to avoid contacting objects within the environment 102 as the scan is performed.

The memory 116 may also store schedule data 228. The schedule data 228 may indicate a schedule of the reality capture robot 100 when scanning the environment 102. For example, from time to time and as the environment 102 changes (e.g., updated, reconfigured, retrofitted, etc.), the reality capture robot 100 may be deployed to rescan the environment 102. This continual process may ensure that the static map is up to date and representative of the environment 102. In some instances, the reality capture robot 100 may be deployed per a predetermined schedule (e.g., every month), or on an as needed basis and when updates to the environment 102 are made. In some instances, the reality capture robot 100 may be scheduled to scan an entirety of the environment 102 or a certain portion of the environment 102. For example, if a certain portion of the environment 102 is reconfigured with shelving, only that portion of the environment 102 may be scanned for updating the static map.

The management system 110 communicatively couples to the robotic drive 108 and provides the static map data 124. The static map data 124 may be used by the robotic drive 108 when traversing about the environment 102 and localizing the robotic drive 108 within the environment 102. The robotic drive 108 is shown including the processor(s) 230 and the memory 232, where the processor(s) 230 may perform various functions and operations associated with traversing about the environment 102, and the memory 232 may store instructions executable by the processor(s) 230 to perform the operations described herein. For example, using the static map data 124, the robotic drive 108 may understand how to travel about the environment 102 from one location to another. As an example, if the robotic drive 108 travels from one location to another to transport a pallet jack, the robotic drive 108 may use the static map data 124 to travel to the location associated with dropping off the pallet jack. The memory 232 of the robotic drive 108 may also store the route data 206 that represents a route of the robotic drive 108. The route data 206 may be generated by the management system 110 and then transmitted to the robotic drive 108. The route data 206 may be determined using the static map data 124.

The robotic drive 108 may represent any suitable robotic device that is configured to traverse about the environment 102. The robotic drive 108 may also include other various sensor(s) 234 as well to assist the robotic drive 108 in traversing about the environment 102. The sensor(s) 234, or sensor data generated by the sensor(s) 234, may be used in combination with the static map data 124 and/or the route data 206 when traversing about the environment 102. The sensor(s) 234 may be similar to the sensor(s) 208 discussed above with regard to the reality capture robot 100. Additionally, the robotic drive 108 may include drive mechanism(s) 236 that propel the reality capture robot 100 about the environment 102. The drive mechanism(s) 236 may be similar to those discussed above with regard to the reality capture robot 100. The robotic drive 108 may also be configured to carry or otherwise haul containers, carts, pallets, and so forth. For example, the robotic drive 108 may travel underneath a cart, and raise upward to pick the cart at least partially off the ground. Therein, the robotic drive 108 may traverse about the environment 102 while being engaged with the cart.

In some instances, the static map may be used to virtually simulate operations within the environment 102. For example, by having a representation of the environment 102, the static map may be used to simulate how robotic devices, personnel, and so forth operate or move within the environment 102. Different simulations, for example, may indicate an operational efficiency within the environment 102. As a brief example, the management system 110 may simulate different numbers of robotic device (e.g., forty, sixty, one hundred, etc.) in the environment 102, where the robotic drives may perform respective tasks. Such simulation, for example, may indicate whether the environment 102 becomes too crowded as well as whether a throughput or operational efficiency with the environment 102 is positively or negatively impacted.

Although certain components of the reality capture robot 100, the robotic drive 108, the management system 110, and the device 200 are shown, other components are additionally or alternatively envisioned. For example, the reality capture robot 100, the robotic drive 108, the management system 110, and the device 200 may include suitable network interface(s) that enable communication over the network(s) 112. The device 200, for example, may also include a display for presenting image or video data of captured by a camera of the reality capture robot 100.

As used herein, a processor, such as the processor(s) 114, the processor(s) 202, the processor(s) 212, and/or the processor(s) 230 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 116, the memory 204, the memory 214, and/or the memory 232 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 3:
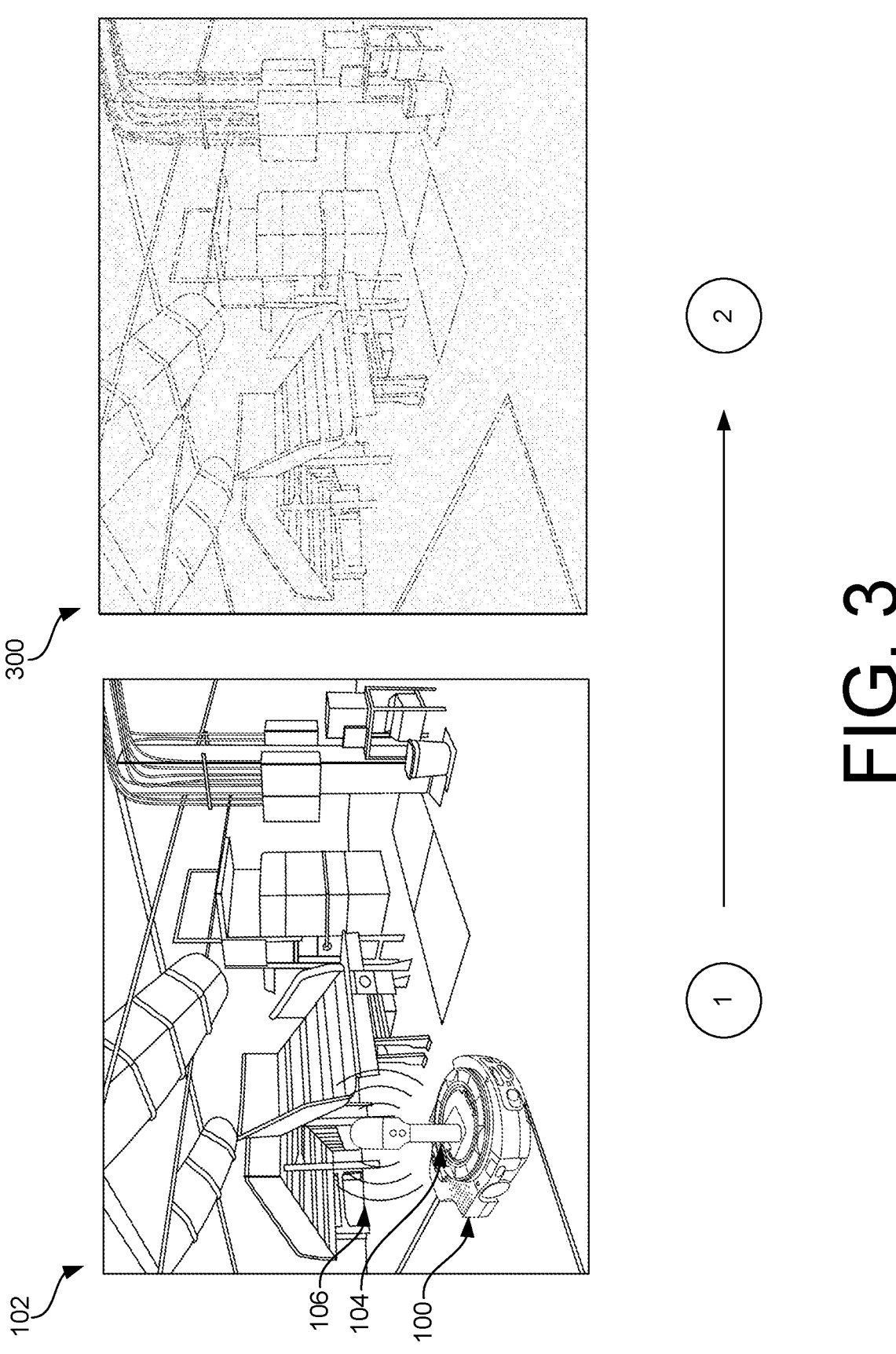
FIG. 3 illustrates an example scenario of the reality capture robot of FIG. 1 scanning an environment to generate a portion of the 3D point cloud of the environment, according to an embodiment of the present disclosure.

FIG. 3 illustrates an example scenario of the reality capture robot 100 traversing the environment 102 to generate the sensor data 118. As introduced above, as the reality capture robot 100 traverses about the environment 102, the LiDAR sensor 104 emits the signals 106. For example, at "1" the LiDAR sensor 104 is shown emitting the signals 106 within the environment 102. As the signals 106 bounce and reflect off objects in the environment 102, the LiDAR sensor 104 receives the returned signals and generates the sensor data 118. Noted above, the reality capture robot 100 may traverse about the environment 102 on a predetermined path, based on the route data 206, or the reality capture robot 100 may be remotely controlled via the operator 210, for example. The illustration shown at "1" represents a snapshot in time of the reality capture robot 100 traversing through a portion of the environment 102.

In some instances, the sensor data 118 represents or is used (e.g., stitched together) to generate a 3D point cloud 300 of the environment 102. For example, at "2" a portion of the 3D point cloud 300 of the environment 102 is shown. The 3D point cloud 300 shown at "2" is representative of a portion of the 3D point cloud 300 of the environment 102. However, as the reality capture robot 100 travels about the environment 102, and to other portions of the environment 102, the 3D point cloud 300 of the environment 102 may be generated.

As such, FIG. 3 illustrates that the reality capture robot 100 may scan the environment 102 to generate the 3D point cloud 300. In turn, the management system 110 utilizes the sensor data 118, as well as the layout data 122, for example, to generate the static map. The static map represents a virtual environment of the environment 102 for understanding where objects are located. Using the static map, for example, the management system 110 may instruct the robotic drives 108 where to travel within the environment 102. Additionally, the robotic drives 108 may use the static map (or the static map data 124) when traveling about the environment 102.

Figure 4:
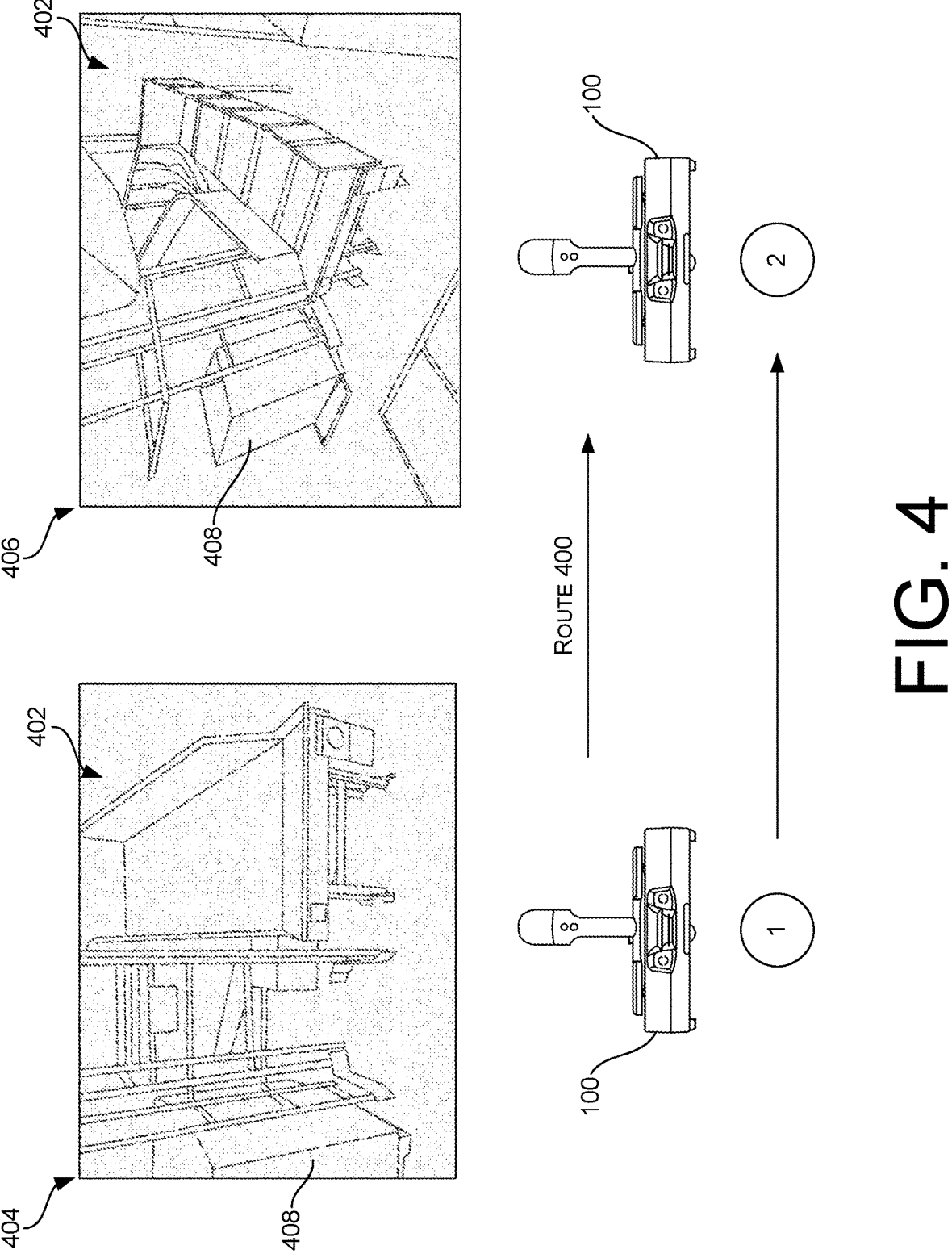
FIG. 4 illustrates an example scenario of the reality capture robot of FIG. 1 scanning a portion of the environment along a route, according to an embodiment of the present disclosure.

FIG. 4 illustrates an example scenario of the reality capture robot 100 traveling along a route 400 for generating the sensor data 118. For example, as the reality capture robot 100 travels along the route 400, the LiDAR sensor 104 may generate sensor data 118 at different locations within the environment 102. This sensor data 118 may be stitched together to generate the 3D point cloud of the environment 102. In other words, as the LiDAR sensor 104 generates the sensor data 118, the sensor data 118 may be combined or stitched together to generate the 3D point cloud.

For example, at "1" the reality capture robot 100 may be at a first location within the environment 102. The first location may be associated with being a first position in front of or by a sortation area 402. The sortation area 402 may represent a region within the environment 102 in which packages are sorted. For example, packages may traverse down a chute within the environment 102 to arrive at the sortation area 402.

As the reality capture robot 100 traverses about the environment 102, the LiDAR sensor 104 may scan portions of the sortation area 402, including the chute, support frames or members of the chute, and so forth. For example, at "1" and at the first location, the reality capture robot 100 may generate the sensor data 118 representative of the sortation area 402. The sensor data 118 at "1" is shown including a first portion 404 of the sensor data 118 representative of LiDAR data captured or a portion of a 3D point cloud.

As the reality capture robot 100 travels along the route 400, and arrives at a second location relative to the sortation area 402, the LiDAR sensors 104 may generate additional sensor data 118. This additional sensor data 118 is representative of the sortation area 402 at the second location. For example, at "2", the reality capture robot 100 may be positioned at a different location relative to the sortation area 402. Given the different location of the reality capture robot 100, the sensor data 118 captured at the second location may include features, objects, and the like that were not captured at "1" and when the reality capture robot 100 was at the first location. That is, the different location permits the LiDAR sensor 104 to scan and detect objects that were previously undetected at the first location. The sensor data 118 at "2" is shown including a second portion 406 of the sensor data 118 representative of LiDAR data captured or a portion of the 3D point cloud.

The sensor data 118 generated at the first location and the second location (or other locations), may be stitched together to generate the 3D point cloud of the environment 102. In some instances, the sensor data 118 is stitched together based on identifying similar objects, features, shapes, entities, and so forth across the sensor data 118. As such, as the reality capture robot 100 travels along the route 400, at different locations, the LiDAR sensor 104 generates the sensor data 118 that is stitched together to generate the 3D point cloud that is representative of a model of the environment 102. This enables the management system 110, for example, to generate the static map data 124 of the environment 102.

In some instances, and as noted above, the management system 110 may be configured to filter out those objects that are mobile within the environment 102. For example, within the sensor data 118, the mapping component 120 may identify those objects that change location. This may be aided, at least in part, using the layout data 122. At the sortation area 402, for example, a gaylord 408 is shown.

When generating the static map, the gaylord 408 may be filtered out given the mobile nature of the gaylord 408. Comparatively, frames of the chute at the sortation area 402 may be considered static objects given that they are not moveable.

Figure 5A:
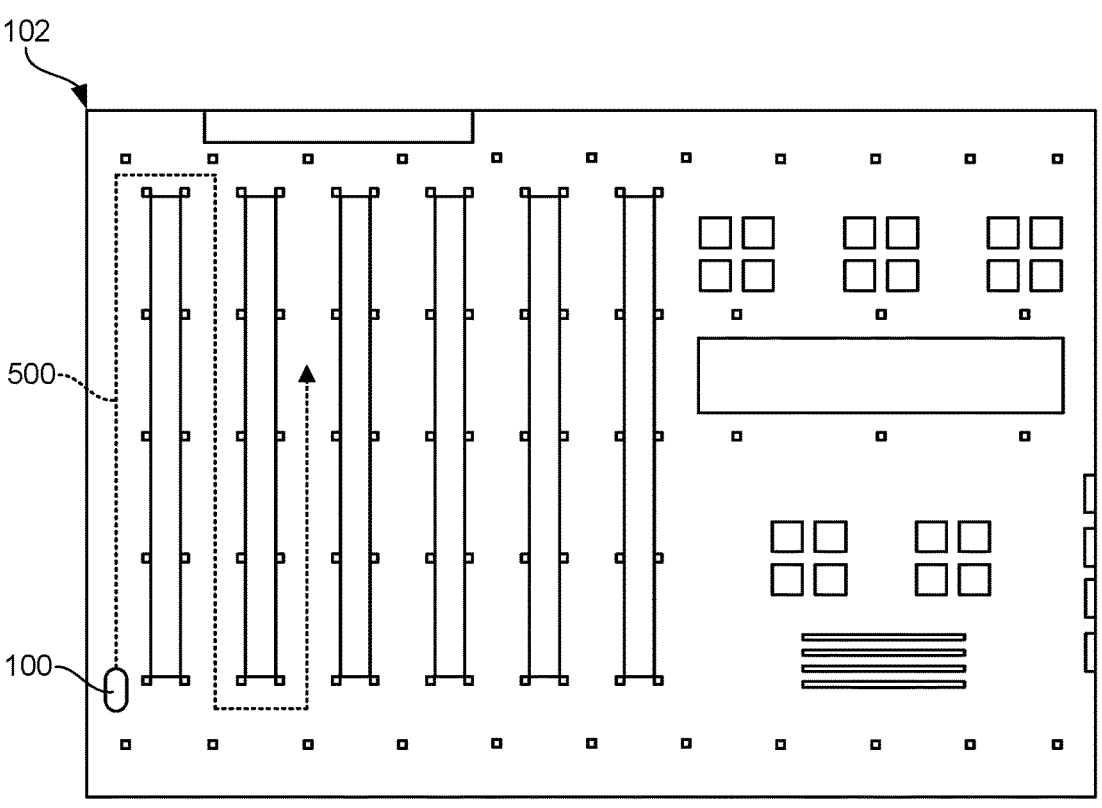
FIG. 5A illustrates an example route of the reality capture robot of FIG. 1 to scan the environment, according to an embodiment of the present disclosure.
Figure 5B:
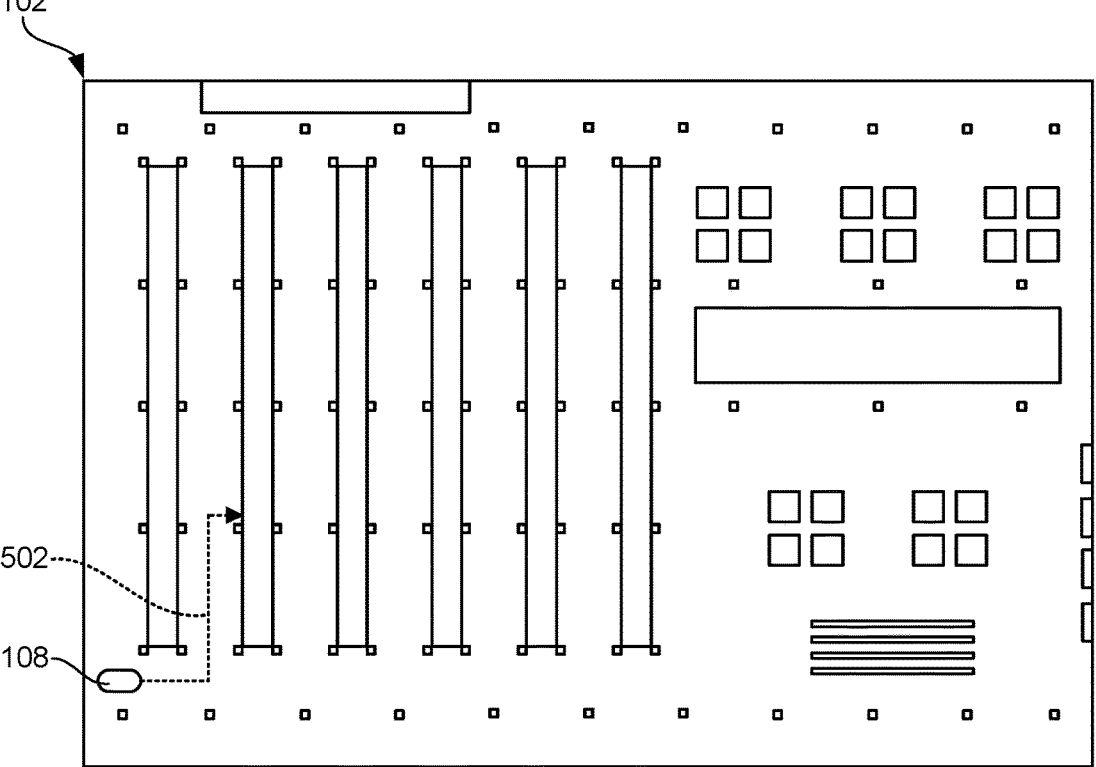
FIG. 5B illustrates an example route of the robotic drive of FIG. 1 traversing the environment, according to an embodiment of the present disclosure.

FIGS. 5A and 5B illustrates a progression of the reality capture robot 100 scanning the environment 102, and subsequently, the robotic drive 108 traversing the environment 102 when performing a task.

In FIG. 5A, the reality capture robot 100 may traverse a route 500 throughout the environment 102. In some instances, the route 500 traverses through shelving, pillars, conveyors, and so forth. Along the route 500, the LiDAR sensor 104 scans the environment 102 and generates the sensor data 118 that is used to generate the static map data 124 of the environment 102. As discussed above, the reality capture robot 100 may travel along the route 500 autonomously (e.g., via the route data 206, the sensor(s) 208, etc.), or the operator 210 may remotely control the reality capture robot 100 along the route 500. The route 500 of the reality capture robot 100 is merely illustrative, and other routes are envisioned. For example, the route 500 may serpentine, zig-zag, wind, or traverse about the environment 102 in any manner.

In FIG. 5B, using the static map data 124, the robotic drive 108 may travel to a particular location within the environment 102. For example, the robotic drive 108 may travel to a particular location within shelving for picking up a cart or dropping off a cart. In such instances, the robotic drive 108 may travel along a route 502 to the shelving. In some instances, the robotic drive 108 may utilize the static map data 124, as well as sensor data generated by sensor(s) 234 of the robotic drive 108, to traverse along the route 502. In other instances, the management system 110, or components thereof, such as a planning component, may determine a schedule for the robotic drive 108 within the environment 102 to perform tasks.

Figure 6:
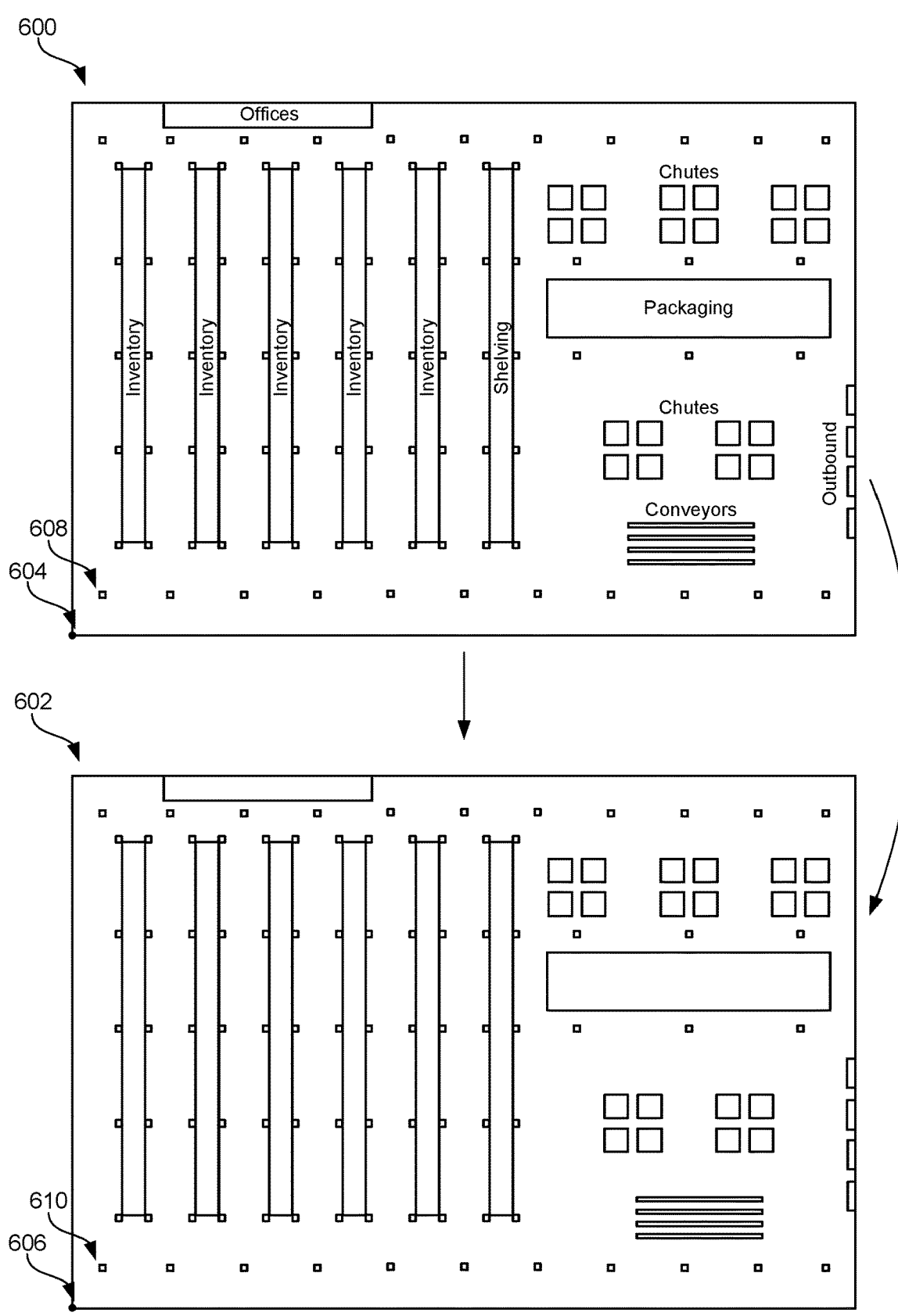
FIG. 6 illustrates an example of aligning a 3D point cloud of the environment with a layout of the environment, according to an embodiment of the present disclosure.

FIG. 6 illustrates an example of aligning a layout 600 with a 3D point cloud 602. In FIG. 6, an aerial view of the environment 102 is shown within the layout 600 and the 3D point cloud 602. The layout 600 may be determined via the layout data 122, while the 3D point cloud 602 may be determined via the sensor data 118. For example, even though the layout data 122 and the sensor data 118 may indicate 3D representations of the environment 102, 2D views of the environment 102 may be determined from the layout data 122 and the sensor data 118, respectively. Arrows in FIG. 6 illustrate the alignment of the layout 600 onto or over the 3D point cloud 602.

The layout 600 is shown including a first origin 604, while the 3D point cloud 602 may include a second origin 606. In some instances, the first origin 604 and the second origin 606 represent a reference point within the layout 600 and the 3D point cloud 602, respectively, for aligning the layout 600 and the 3D point cloud 602. In this sense, by aligning the first origin 604 and the second origin 606, the layout 600 and the 3D point cloud 602 may be aligned for comparing the layout 600 and the 3D point cloud 602. In some instances, the first origin 604 and the second origin 606 may represent an intersection of two walls of the environment 102 (e.g., a bottom left corner).

Alternatively, in other instances, the layout 600 and the 3D point cloud 602 may be compared by aligning a first pillar 608 in the layout 600 within a second pillar 610 in the 3D point cloud 602. The first pillar 608 and the second pillar 610 may represent the same pillar within the environment 102. Regardless, by aligning the layout 600 and the 3D point cloud 602, the mapping component 120 is able to compare objects within the layout 600 to respective objects in the 3D point cloud 602.

The layout 600 is shown including classifiers associated with objects in the environment 102. For example, the classifiers within the layout 600 may identify the objects within the environment 102, such as offices, inventory, chutes, conveyors, and outbound stations. These classifiers are merely illustrative and the layout 600 may identify other objects in the environment 102 with different classifiers. In some instances, the classifiers may be human-labeled, and may be determined via blueprints or AutoCAD files when building the environment 102. Additionally, the objects within the layout 600 may be classified at a more granular level. For example, the layout 600 may include classifiers for individual chutes within the environment 102. In this sense, an operator may zoom in on the layout 600 to observe the environment 102 at a closer or more granular level.

The classifiers within the layout 600 are used to annotate, or classify, the objects within the 3D point cloud 602. For example, the objects detected within the 3D point cloud 602 may be classified using the classifiers within the layout 600. The classifier 222 may identify the classifiers within the layout 600 and utilize those classifiers to classify the objects within the 3D point cloud 602 when the layout 600 and the 3D point cloud 602 are aligned. Additionally, or alternatively, the machine-learned model(s) 224 may be used to classify the objects within the 3D point cloud 602. In some instances, the classifier 222 may utilize the classifiers within the layout 600 to increase the confidence of the objects, or the objects classified, within the 3D point cloud 602. The 3D point cloud 602 is annotated with the classifiers in order to generate the static map data 124. By annotating the static map data 124, the static map is usable to understand the environment 102 and where objects are located. Such static map data 124 is interpretable by the robotic drive 108, and may also be human-readable.

The environment 102 as depicted in the layout 600 and the 3D point cloud 602 is merely illustrative. The layout 600 and/or the 3D point cloud 602 may include objects that are different than those shown. Moreover, the layout 600 and the 3D point cloud 602 need not be the same, and certain objects shown in the layout 600 may not be present in the 3D point cloud 602. In these instances, the mapping component 120 is configured to determine the discrepancies between the layout 600 and the 3D point cloud 602 for use in generating the static map data 124 that is an accurate representation of the environment 102.

Additionally, although FIG. 6 illustrates a particular alignment of the layout 600 and the 3D point cloud 602, other alignments are envisioned. For example, different views of the layout 600 and the 3D point cloud 602 may be aligned. FIG. 6, for example, illustrates an aerial view of the layout 600 and the 3D point cloud 602 (e.g., X and Y-planes), a side view of the layout 600 and the 3D point cloud 602 may be aligned (e.g., X and Z-planes). The layout 600 and the 3D point cloud 602 may also be aligned in 3D space.

Figure 7:
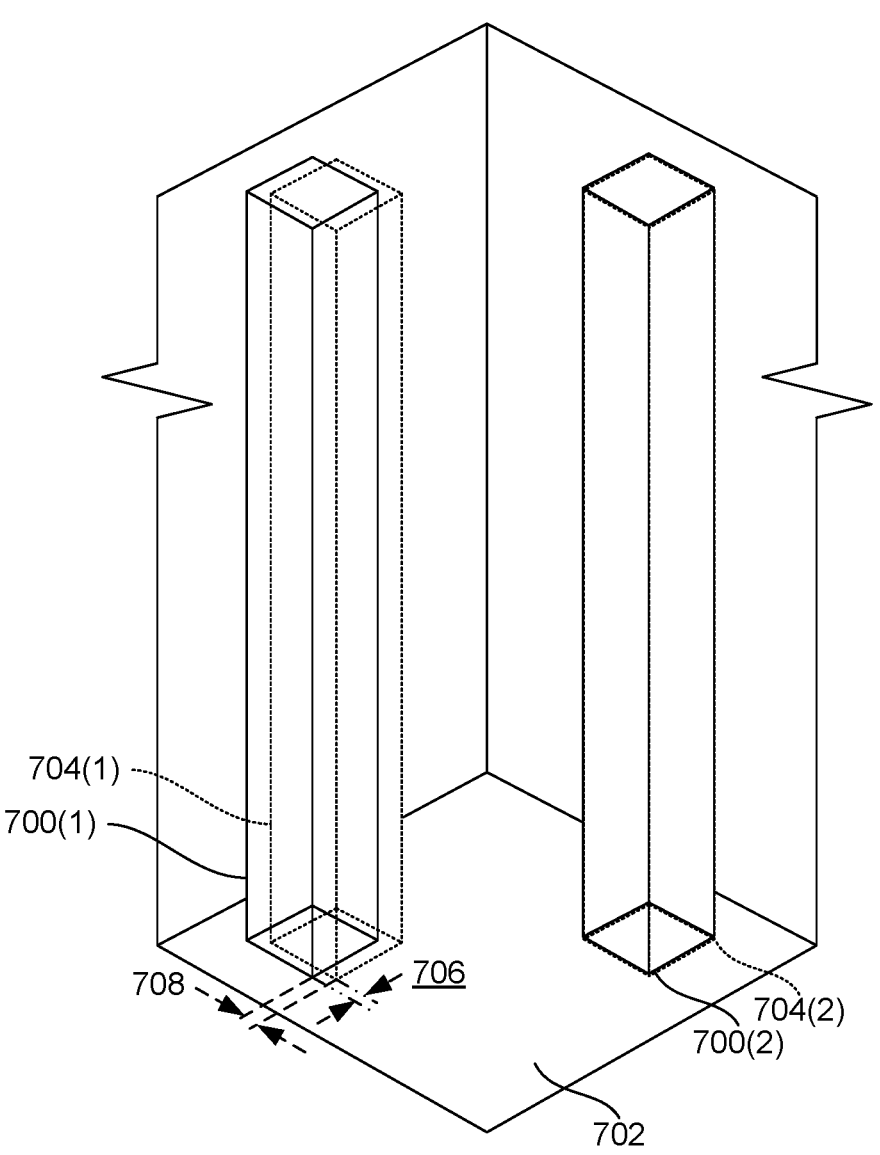
FIG. 7 illustrates an example of aligning a portion of a 3D point cloud of the environment with a portion of a layout of the environment, according to an embodiment of the present disclosure.

FIG. 7 illustrates an example of aligning objects from a layout of the environment 102 (such as the layout 600) with objects from a 3D point cloud (such as the 3D point cloud 602). In FIG. 7, a 3D view of the environment 102 is shown. The 3D view may be generated using the layout data 122 depicting the layout and the sensor data 118 depicting the 3D point cloud. For example, in connection with the discussion in FIG. 6, origins of the layout and the 3D point cloud may be aligned, or certain pillars may be aligned.

In FIG. 7, a first pillar 700(1) and a second pillar 700(2) are shown extending from a floor 702 of the environment 102. In some instances, the first pillar 700(1) and the second pillar 700(2) represent pillars within or as determined from the layout data 122. For example, the layout data 122 may indicate locations of the first pillar 700(1) and the second pillar 700(2) in coordinate space and within the environment 102. Other information of the first pillar 700(1) and the second pillar 700(2) may be determined from the layout data 122. For example, the layout data 122 may indicate a width, depth, length, height, shape, and so forth of the first pillar 700(1) and the second pillar 700(2). The layout data 122 may also be used to determine a distance between the first pillar 700(1) and the second pillar 700(2).

After scanning the environment 102, and generating the sensor data 118, the mapping component 120 may determine discrepancies between the layout data 122 and the sensor data 118. For example, the sensor data 118 may scan the environment 102 and generate sensor data 118 representative of the first pillar 700(1) and the second pillar 700(2). As shown in FIG. 7, a first pillar 704(1) and a second pillar 704(2) are shown in dashed lines, indicating that the first pillar 704(1) and the second pillar 704(2) are determined from the sensor data 118 (as compared to the layout data 122). As such, by aligning the layout data 122 and the sensor data 118, the locations of the first pillar 700(1), the first pillar 704(1), the second pillar 700(2), and the second pillar 704(2) are indicated. However, the first pillar 700(1) and the first pillar 704(1) may correspond to the same pillar within the environment 102, and the second pillar 700(2) and the second pillar 704(2) may correspond to the same pillar within the environment 102.

By aligning the layout data 122 and the sensor data 118, the mapping component 120 determines discrepancies. For example, the first pillar 700(1) and the first pillar 704(1) are shown being offset from one another. The first pillar 700(1) and the first pillar 704(1) may be separated from one another by a first distance 706 in a first direction (e.g., X-direction), and a second distance 708 in a second direction (e.g., Y-direction). However, being as the first pillar 704(1), as determined from the sensor data 118, may represent the ground truth of the environment 102, the static map data 124 may generated using the location of the first pillar 704(1) as determined from the sensor data 118. In this instance, the mapping component 120 may determine that the first pillar 700(1) in the layout data 122 is misrepresented or incorrect. Thus, the use of the reality capture robot 100 serves to obtain accurate locations of the objects within the environment 102. However, the layout data 122 may be used to annotate the first pillar 704(1) as a pillar in the environment 102.

As also shown in FIG. 7, the second pillar 700(2) and the second pillar 704(2) are substantially aligned. In this instance, the mapping component 120 may determine that the location of the second pillar 700(2) in the layout data 122 is accurate. In some instances, this determination may be based on the second pillar 700(2) and the second pillar 704(2) being within a threshold distance of one another.

The alignment illustrated in FIG. 7 is merely illustrative. Other objects within the layout data 122 and the sensor data 118 may aligned for determining discrepancies therebetween. For example, frames of conveyors, frames of shelving, and so forth may be compared. Moreover, the mapping component 120 may determine discrepancies in 3D, for determining discrepancies in multiple directions, or along multiple axes.

Figure 8:
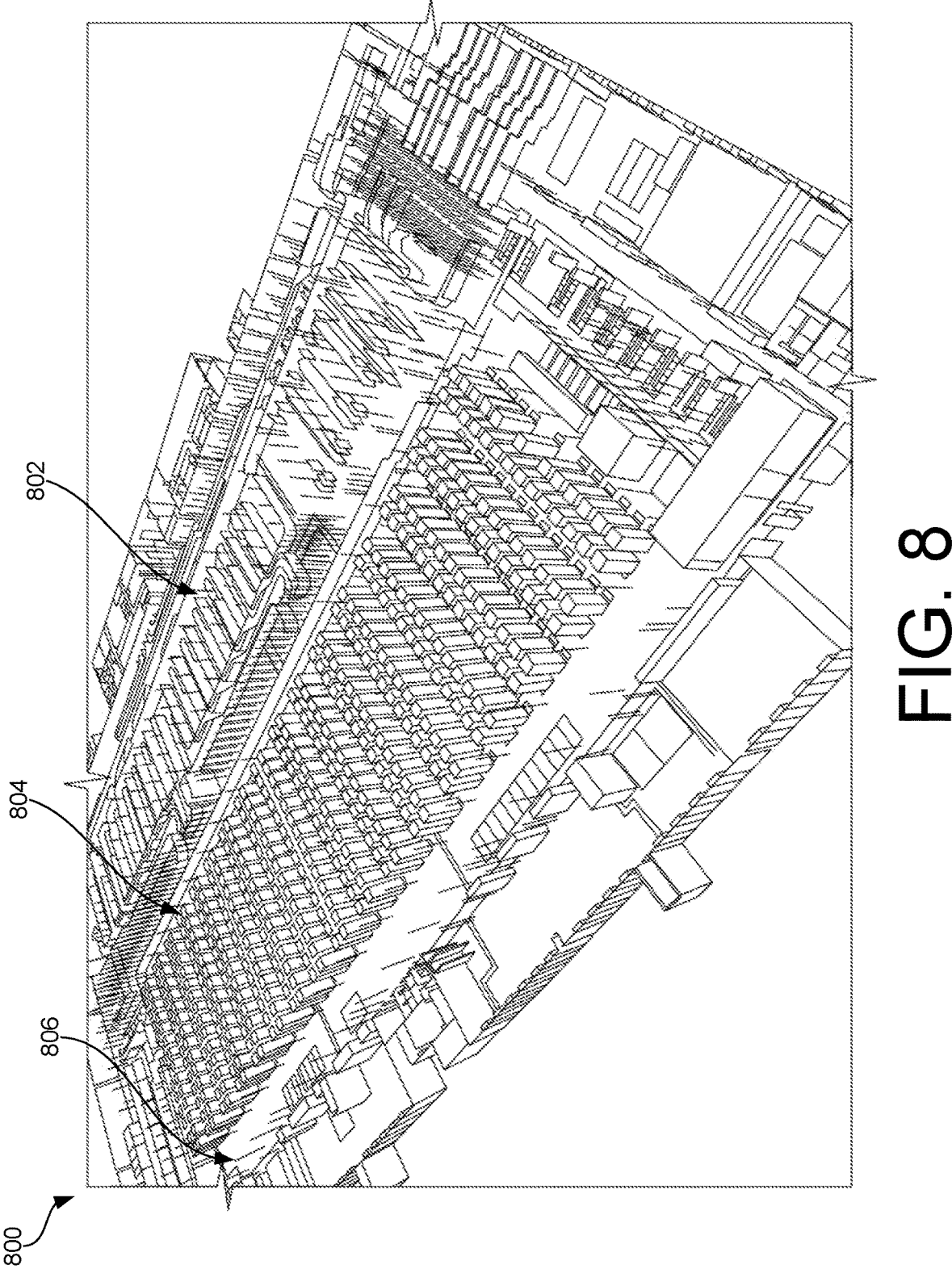
FIG. 8 illustrate an example static map of the environment, according to an embodiment of the present disclosure.

FIG. 8 illustrates an example static map 800 of the environment 102. The static map 800 represents a 3D map of the environment 102. In some instances, the static map 800 may be engaged with such that an operator may pan about the environment 102 (e.g., using a cursor), zoom into and out of the environment 102, and so forth. In this sense, the static map 800 may represent a 3D map of the environment 102 for visually observing the entities and the objects within the environment 102. As an example, an operator or computing device may utilize the static map 800 to determine a distance between objects (e.g., pillars) in the environment 102. Such data, or information, is generated as part of the reality capture robot 100 scanning the environment 102 using the LiDAR sensor 104.

In some instances, the static map 800 may be annotated with classifiers that identify the objects. For example, the environment 102 is shown including conveyors 802, chutes 804, and pillars 806. Within the static map 800, the conveyors 802, the chutes 804, and the pillars 806 may be identified with classifiers. This allows personnel and computing devices to understand the objects within the environment 102, or what is represented within the static map 800. However, other objects within the environment 102, such as walls, tables, picking stations, shelving, and so forth may be classified. In some instances, the classifiers may be presented as the static map 800 is zoomed in on. The granularity or amount of classifiers displayed may also be dependent on a viewpoint or magnification of the static map.

In some instances, the static map 800 is positioned or outlined within a grid or coordinate space. In such instances, the environment 102 may be modeled in 3D space. Furthermore, mapping the environment 102 in 3D space allows for the objects to be associated with certain coordinate positions for determining the locations of the objects, a size of the objects, distances between the objects, and so forth. The static map 800 is shown being a single story or floor, however, environments that include multiple stories or floors may be scanned and combined to generate an appropriate static map of the environment 102.

Figure 9:
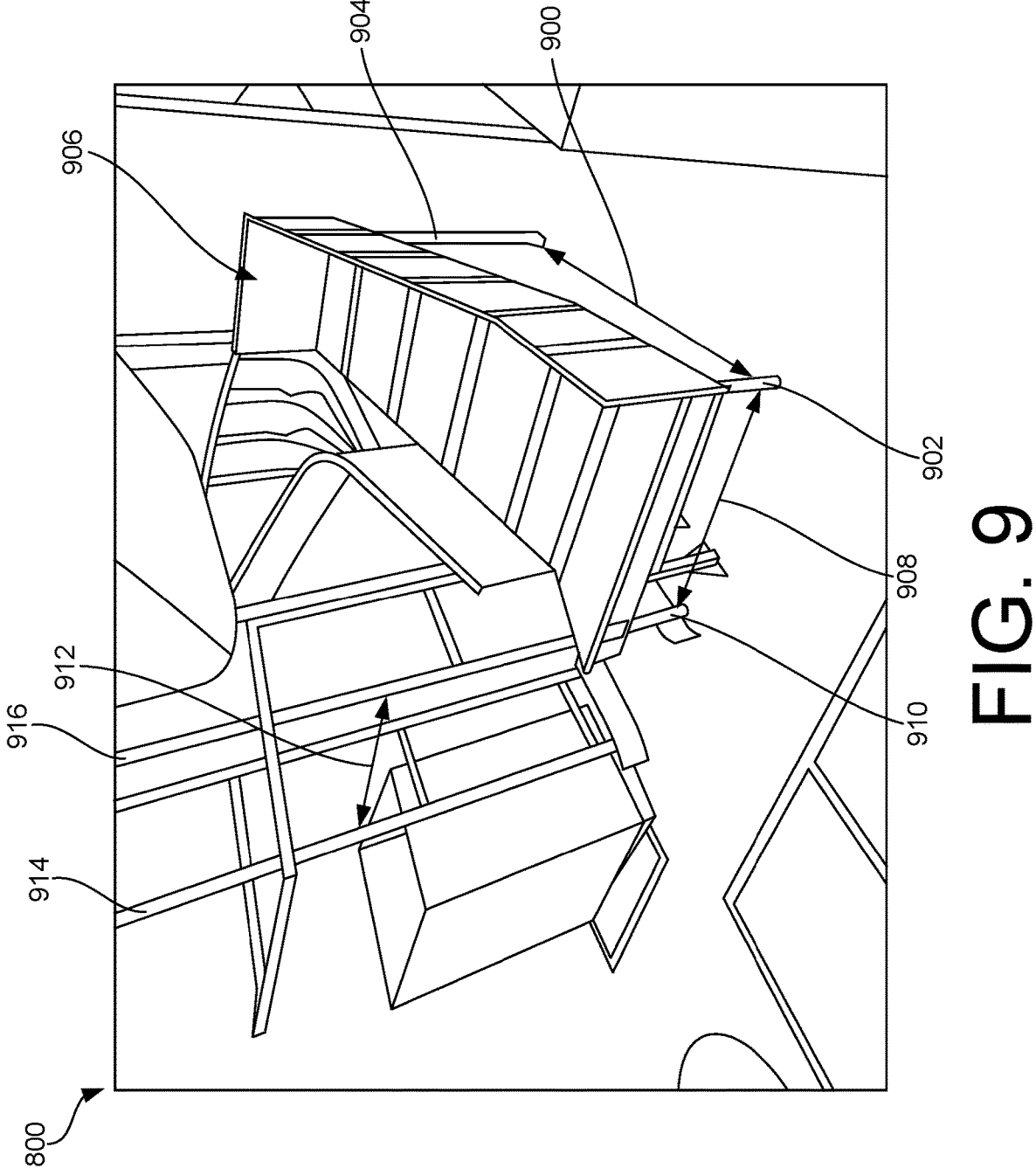
FIG. 9 illustrates an example scenario of using a static map of the environment to determine locations of structures within the environment, according to an embodiment of the present disclosure.

FIG. 9 illustrates a portion of the static map 800 of the environment 102. For example, the portion of the static map 800 shown in FIG. 9 may represent a portion of the static map 800 shown in FIG. 8. The portion of the static map 800 shown in FIG. 9 may be zoom into, for example, from the view to the static map 800 shown in FIG. 8. In other words, from the view shown in FIG. 8, zooming into the static map 800 may illustrate the portion of the static map shown in FIG. 9.

The static map 800 may be used to understand distances between objects, or entities, within the environment 102. For example, an operator may engage with the static map 800 to determine a first distance 900 interposed between a first leg 902 and a second leg 904 within the environment 102. The first leg 902 and the second leg 904 may support a chute 906 (e.g., a chute among the chutes 804). In some instances, the first distance 900 between the first leg 902 and the second leg 904 may be used to determine a location of the chute 906 within the environment 102, for example, when instructing the robotic drive 108 to travel to the chute 906 and pick up packages.

The first distance 900 is merely illustrative of how the static map 800 may be used to determine a location or placement of objects within the environment 102. For example, a second distance 908 may be determined between the first leg 902 and a third leg 910. A third distance 912 may be determined between a first wall 914 and second wall 916. The third distance 912, for example, may indicate a permissible width of carts that may be received within the first wall 914 and the second wall 916. The use of the static map 800 in FIG. 9 is merely illustrative, and personnel or computing devices may interact with the static map 800 in other instances. In doing so, the static map 800 may be used to determine where objects are located within the environment 102.

FIGS. 10-13 illustrate various processes related to scanning an environment and generating a static map. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, devices, and systems described in the examples herein, such as, for example those described with respect to FIGS. 1-9, although the processes may be implemented in a wide variety of other environments, architectures, devices, and systems.

FIG. 10 illustrates an example process 1000 for scanning an environment 102, determining a static map of the environment 102, and using the static map to instruct robotic drives 108 within the environment 102.

At 1002, the process 1000 may include determining a first route for a reality capture robot within an environment. For example, the management system 110 may determine a route for the reality capture robot 100 when scanning the environment 102. In some instances, rather than determining the first route for the reality capture robot 100, a portion of the environment 102 that is to be scanned by the reality capture robot 100 may be determined. In some instances, route data 206 is generated and then sent to the reality capture robot 100 for traversing along the route. In some instances, the route may traverse (e.g., wind, zig zag, etc.) through an entirety of the environment 102 such that reality capture robot 100 scans the entirety of the environment 102. In other instances, the route may be within a specific portion of the environment 102 such that the reality capture robot 100 only scans a portion of the environment 102. Additionally, although discussed herein as determining a route, the reality capture robot 100 may be remotely controlled with the environment via the operator 210, for example. In some instances, the portion of the environment 102 that is scanned is a portion of the environment 102 in which the robotic drive 108 autonomously operates. In some instances, the management system 110 may use the layout data 122 of the environment 102 to determine an approximate or estimated localization of the objects. This may allow the management system 110 to approximate the locations of the objects within the environment 102 for determining the route.

At 1004, the process 1000 may include causing the reality capture robot to traverse the route. For example, the reality capture robot 100 may autonomously travel along the route to scan the environment 102. The route may be associated with a scan area of the environment 102, or an area of the environment 102 to be scanned. In some instances, the reality capture robot 100 may use the sensor(s) 208 to traverse about the environment 102, in addition to the route data 206. For example, the reality capture robot 100 may image fiducials on the floor of the environment 102 in order to traverse along the route. As the reality capture robot 100 travels along the route, the LiDAR sensor 104 of the reality capture robot 100 scans the environment 102 to generate the sensor data 118.

At 1006, the process 1000 may include receiving LiDAR data from the reality capture robot 100. For example, after the reality capture robot 100 scans the environment 102, or while the reality capture robot 100 is scanning the environment 102, the management system 110 receives the sensor data 118. As such, the management system 110 may receive the sensor data 118 after the reality capture robot 100 completes a scan of the environment 102, or while the reality capture robot 100 is scanning the environment 102. In some instances, the sensor data 118 is raw or unprocessed data.

At 1008, the process 1000 may include determining, based at least in part on the LiDAR data, a 3D point cloud of the environment. For example, the mapping component 120 of the management system 110 may stitch together the sensor data 118 together to generate the 3D point cloud of the environment 102. In some instances, the sensor data 118 is stitched together using a location of the reality capture robot 100 within the environment 102, or by identifying similar objects within the sensor data 118 as the reality capture robot 100 traverses along the route. Although discussed herein as generating the 3D point cloud from the sensor data 118, the sensor data 118 as received from the reality capture robot 100 may be representative of or indicate the 3D point cloud. For example, the reality capture robot 100 may generate, using the sensor data 118, the 3D point cloud of the environment 102.

At 1010, the process 1000 may include determining a layout of the environment 102. For example, the management system 110 may access the layout data 122 for determining the layout of the environment 102. The layout data 122 may be determined for aligning the 3D point cloud thereto. That is, by having the 3D point cloud and the layout of the environment 102, the management system 110 may align the 3D point cloud and the layout to determine discrepancies. In some instances, the layout may be labeled or annotated to identify the objects within the environment 102 (e.g., shelving, conveyors, chutes, and so forth).

At 1012, the process 1000 may include aligning the layout and the 3D point cloud. For example, the management system 110 may align the layout and the 3D point cloud. In some instances, origins or reference points in the layout and the 3D point cloud such that like objects are compared within one another across the layout and the 3D point cloud. For example, certain walls, pillars, or a corner of the environment 102 may be aligned. By aligning the layout and the 3D point cloud, the management system 110 may determine differences between the layout and the 3D point cloud. In instances where the reality capture robot 100 scans a portion of the environment 102, a corresponding portion of the layout may be determined for aligning the 3D point cloud thereto. For example, in instances where reality capture robot 100 scans a portion of the environment 102, the management system 110 may determine corresponding portion of the layout for aligning with the 3D point cloud.

At 1014, the process 1000 may include annotating the 3D point cloud. For example, the management system 110 may annotate the 3D point cloud using the classifiers within the layout. By aligning the 3D point cloud and the layout, the classifiers within the layout may assist in understanding the objects detected within the 3D point cloud. For example, the classifiers may assist the management system 110 understanding what certain lines, shapes, outlines, or objects represent within the 3D point cloud. Additionally, or alternatively, annotating the 3D point cloud may be based on machine-learned model(s) 224 detecting and classifying certain objects within sensor data 118. For example, certain objects in the 3D point cloud may not be present in the layout. In such instances, the machine-learned model(s) 224 may be trained to detect and classify objects within the 3D point cloud.

At 1016, the process 1000 may include generating a static map of the environment. For example, the mapping component 120 may generate the static map based on the 3D point cloud. In some instances, after annotating the 3D point cloud using the layout data 122, the static map may be generated. The static map is representative of the objects within the environment 102 and their relative location to other objects within the environment 102. Using the static map, for example, a relative location of the objects within the environment 102 may be determined.

The static map may represent those objects within the environment 102 that are non-dynamic (e.g., not movable). In this sense, the static map may represent structures of the environment 102, as compared to objects within the environment 102 that move, such as humans, boxes, robots, and so forth. In some instances, classifying the objects may assist in filtering out dynamic or movable objects within the environment 102. For example, the layout data 122 may indicate which objects are static or dynamic in the environment 102. In other instances, the machine-learned model(s) 224 may detect or classify those objects within the environment 102 that are movable. In this sense, the machine-learned model(s) 224 may be trained to identify objects within the environment 102 to pallets, gaylords, boxes, humans, robots, and so forth.

At 1018, the process 1000 may include determining, based at least in part on the static map, a second route for a robotic drive in the environment. For example, using the static map that is generated, management system 110 may determine a second route for the robotic drive 108 to complete a task (e.g., transporting a pallet). In some instances, the management system 110 may transmit the static map to the robotic drive 108 for use by the robotic drive 108 when traversing about the environment 102. For example, the static map may assist the robotic drive 108 localizing itself in the environment 102 and for knowing how to traverse about the environment 102 when moving between locations. Additionally, or alternatively, the static map may be provided to the robotic drive 108 for moving about the environment 102.

Although the process 1000 illustrates instructing a single reality capture robot to scan the environment 102, in some instances, more than one reality capture robot may be used to scan the environment 102. Thereafter, the sensor data from the two reality capture robots may be combined to form the 3D point cloud. For example, a first reality capture robot may scan a first portion of the environment 102, and a second reality capture robot may scan a second portion of the environment 102. In such instances, the scans may or may not be combined, however, the scans may be used to generate a 3D point cloud that represents at least a portion of the environment 102. In instances where the scans from different reality capture robots are combined, sufficient overlap exists between the scans such that the sensor data may overlap and be stitched together.

Additionally, although the process 1000 is describe as determining the static map based on aligning the layout and the 3D point cloud, in some instances, the machine-learned model(s) 224 may be trained to compare those objects depicted in the sensor data 118 against a library of objects. For example, the library of objects may include representations of pillars, picking stations, chutes, pallets, conveyor systems, and so forth. Comparison of the sensor data 118 to the library of objects may indicate, or be used to identify, those objects that are depicted in the sensor data 118. In such instances, the static map data 124 may be determined with or without alignment of the 3D point cloud (or other 3D spatial map) to the layout data 122. However, alignment may be used to extract some information from 3D spatial map (e.g. geometry and position), other information from layout (e.g. station type, station number) and combine them to create the static map.

FIG. 11 illustrates an example process 1100 for comparing a layout and a static map of the environment 102 for determining one or more discrepancies.

At 1102, the process 1100 may include receiving LiDAR data from a reality capture robot. For example, after the reality capture robot 100 scans the environment 102, or while the reality capture robot 100 is scanning the environment 102, the management system 110 may receive the sensor data 118. As such, the management system 110 may receive the sensor data 118 after the reality capture robot 100 completes a scan of the environment 102, or while the reality capture robot 100 is scanning the environment 102.

At 1104, the process 1100 may include determining, based at least in part on the LiDAR data, a 3D point cloud of the environment. For example, the mapping component 120 of the management system 110 may stitch the sensor data 118 together to generate the 3D point cloud of the environment 102. In some instances, the sensor data 118 is stitched together using a location of the reality capture robot 100 within the environment 102, or by identifying similar objects within the sensor data 118 as the reality capture robot 100 traverses along a route. In other instances, the sensor data 118 as received from the reality capture robot 100 may be representative of or indicate the 3D point cloud. For example, the reality capture robot 100 may generate, using the sensor data 118, the 3D point cloud of the environment 102.

At 1106, the process 1100 may include determining, based at least in part on the 3D point cloud, first coordinate positions of a structure within the environment. For example, using the 3D point cloud, the mapping component 120 may determine first coordinate positions of the structure within the environment 102. The structure, for example, may be a pillar 1116 within the environment 102. In some instances, the first coordinate positions may indicate a width of the pillar 1116, a height of the pillar 1116, and length of the pillar 1116 within 3D space. For example, the pillar 1116 may extend from a first coordinate position to a second coordinate position along a first axis (X-axis), from a third coordinate position to a fourth coordinate position along a second axis (Y-axis), and from a fifth coordinate position to a sixth coordinate position along a third axis (Z-axis). These coordinate positions are used to determine a space occupied by the pillar 1116 within the environment 102.

At 1108, the process 1100 may include determining a layout for the environment. For example, the management system 110 may access the layout data 122 for determining the layout of the environment 102. The layout data 122 may be determined for aligning the 3D point cloud thereto, as well as how the objects are positioned within the environment 102, or where the objects are located. Additionally, by having the 3D point cloud and the layout of the environment 102, the management system 110 may align the 3D point cloud and the layout to determine discrepancies.

At 1110, the process 1100 may include determining, based at least in part on the layout, second coordinate positions of a structure within the environment. For example, using the layout, the mapping component 120 may determine second coordinate positions of the structure within the environment 102. The structure, for example, may be a pillar 1118 within the environment 102. The pillar 1118 in the layout may be the same as the pillar in the 3D point cloud. In some instances, the second coordinate positions may indicate a width of the pillar 1118, a height of the pillar 1118, and length of the pillar 1118 within 3D space. For example, the pillar 1118 may extend from a first coordinate position to a second coordinate position along a first axis (X-axis), from a third coordinate position to a fourth coordinate position along a second axis (Y-axis), and from a fifth coordinate position to a sixth coordinate position along a third axis (Z-axis). These coordinate positions are used to determine a space occupied by the pillar 1118 within the environment 102.

At 1112, the process 1100 may include determining whether the first coordinate positions are different than the second coordinate positions. For example, the mapping component 120 may determine whether the first coordinate positions are the same as, or different than, the second coordinate positions. In some instances, whether the first coordinate positions and the second coordinate positions are the same or different may be based on aligning the layout with the 3D point space (or portions thereof). As such, the mapping component 120 may determine whether discrepancies exist between the layout and the 3D point cloud. In some instances, the 3D point cloud may represent the ground truth, and what the environment 102 actually represents or includes.

If at 1112 the process 1100 determines that the first coordinate positions and the second coordinate positions are not different, the process 1100 may follow the "NO" route and proceed to 1102. For example, the process 1100 may continue to receive the LiDAR data for determining other discrepancies between the layout and the 3D point cloud. Such determination may be based on the same LiDAR data, or additional LiDAR data received from the reality capture robot 100. In some instances, if the first coordinate positions and the second coordinate positions are not different by a threshold amount, the process 1100 may determine that the first coordinate positions and the second coordinate positions are the same.

Alternatively, if at 1114 the process 1100 determines that the first coordinate positions and the second coordinate positions are different, the process 1100 may follow the "YES" route and proceed to 1114. At 1114, the process 1100 may include generating, based at least in part on the first coordinate positions, a static map of the environment. That is, using the first coordinate positions, the mapping component 120 may generate the static map data 124. The mapping component 120 may also use the 3D point cloud, as well as classifiers in the layout, for generating the static map data 124. For example, the layout may be used to classify the objects within the 3D point cloud.

Figure 12:
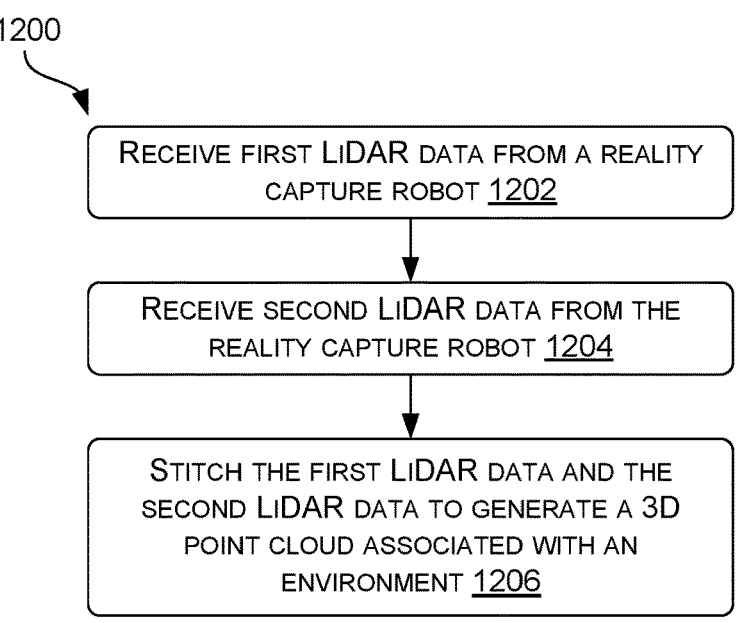
FIG. 12 illustrates an example process for generating a 3D point cloud of the environment, according to an embodiment of the present disclosure.

FIG. 12 illustrates an example process 1200 for stitching together LiDAR data for generating a 3D point cloud of the environment 102, or a portion of the environment 102.

At 1202, the process 1200 may include receiving first LiDAR data from a reality capture robot. For example, the management system 110 may receive first sensor data 118 representative of a first scan of the LiDAR sensor 104 within the environment 102. The first LiDAR data may be generated at a first location within the environment 102, or at a first location along the route.

At 1204, the process 1200 may include receiving second LiDAR data from the reality capture robot. For example, the management system 110 may receive second sensor data 118 representative of a second scan of the LiDAR sensor 104 within the environment 102. The second LiDAR data may be generated at a second location within the environment 102, or at a second location along the route. The second location may be after the first location, or stated alternatively, the second sensor data 118 may be generated after the first sensor data. As such, as the reality capture robot 100 travels along the route, the LiDAR sensor 104 may capture the sensor data 118 at different locations.

At 1206, the process 1200 may include stitching the first LiDAR data and the second LiDAR data to generate a 3D point cloud associated with an environment. For example, using the first LiDAR data and the second LiDAR data, the mapping component 120 may stitch together the first LiDAR data and the second LiDAR data to generate the 3D point cloud. In some instances, the first LiDAR data and the second LiDAR data may be stitched together based on locations of the reality capture robot 100 capturing the first LiDAR data and the second LiDAR data. In other instances, the first LiDAR data and the second LiDAR data may be stitched together based on identifying similar objects within the first LiDAR data and the second LiDAR data.

By stitching together the first LiDAR data and the second LiDAR data, the management system 110 may compare the 3D point cloud data with the layout. Although the 3D point cloud is described as stitching together the first LiDAR data and the second LiDAR data, more than two LiDAR data may be stitched together. Moreover, in some instances, the reality capture robot 100 may itself stitch together the first LiDAR data and the second LiDAR data. In such instances, the reality capture robot 100 may transmit the stitched LiDAR data to the management system 110.

Figure 13:
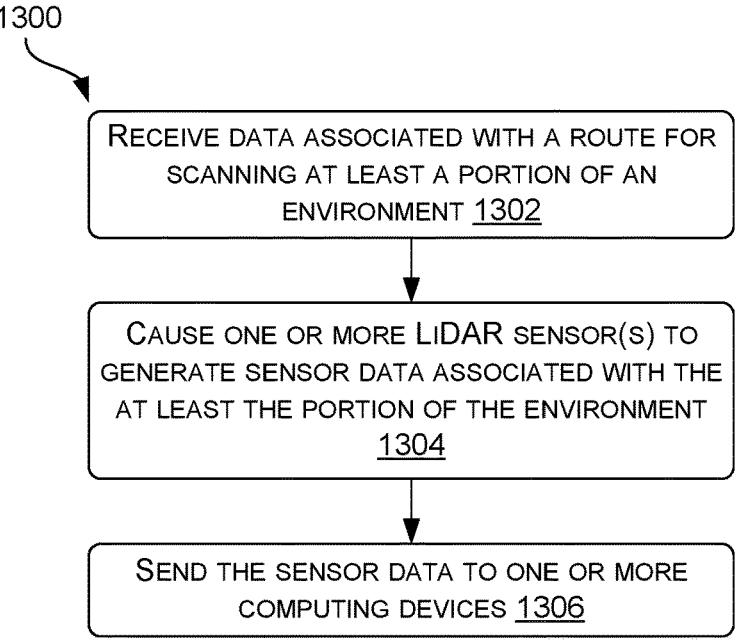
FIG. 13 illustrates an example process for scanning the environment using the reality capture robot of FIG. 1, according to an embodiment of the present disclosure.

FIG. 13 illustrates an example process 1300 associated with a reality capture robot 100 scanning at least a portion of an environment 102.

At 1302, the process 1300 may include receiving data associated with a route scanning at least a portion of an environment. For example, the reality capture robot 100 may receive, from the management system 110, route data 206. The route data 206 may be indicative of a route along which the reality capture robot 100 is to travel within the environment 102. Along the route, the LiDAR sensor 104 may scan the environment 102. In some instances, the route extends or is disposed through a portion of the environment 102, or through an entirety of the environment 102. The route may also include various turns, zig-zags, and so forth such that the reality capture robot 100 may scan the environment 102 around objects positioned in the environment 102.

At 1304, the process 1300 may include causing one or more LiDAR sensors to generate sensor data associated with the at least the portion of the environment. For example, as the reality capture robot 100 travels along the route, the LiDAR sensor 104 may scan the environment 102 and generate sensor data 118. In some instances, the LiDAR sensor 104 may scan the environment 102 at a certain frequency for generating the sensor data 118. Additionally, while the LiDAR sensor 104 is scanning the environment 102, the reality capture robot 100 may travel at a predetermined speed (e.g., two miles per hour (mph)). In some instances, the LiDAR sensor 104 may continuously scan the environment 102 as the reality capture robot 100 travels along the route.

At 1306, the process 1300 may include sending the sensor data to one or more computing devices. For example, after the reality capture robot 100 traverses the route, and the LiDAR sensor 104 scans the environment 102, the reality capture robot 100 may send (e.g., transmit, upload, etc.) the sensor data to the management system 110. In turn, the management system 110 may generate the static map of the environment 102. However, although the reality capture robot 100 is discussed as sending the sensor data 118 once the route is completed, in some instances, the reality capture robot 100 may send the sensor data 118 on a continuous basis as the reality capture robot 100 traverses the route. In this sense, the sensor data 118 may be uploaded in real-time.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

determining, by one or more computer processors coupled to memory, at least a portion of an environment to be scanned by a robotic device comprising one or more three dimensional (3D) imaging sensors;

causing the robotic device to autonomously scan the at least the portion of the environment using the one or more 3D imaging sensors;

receiving, from the robotic device, sensor data generated by the one or more 3D imaging sensors;

generating, based at least in part on the sensor data, a 3D spatial map representing the at least the portion of the environment;

identifying, based at least in part on layout data, a layout of the environment, the layout including:

a first location of a first object within the environment, and a first representation associated with the first object;

determining at least one discrepancy between the 3D spatial map and the layout, the at least one discrepancy including a second location of a second object within the environment, the second object being the same as the first object;

determining, based at least in part on the first representation, a second representation associated with the second object within the 3D spatial map;

determining a third object and a fourth object within the 3D spatial map;

determining that the third object represents a static object within the environment;

determining that the fourth object represents a dynamic object within the environment;

generating, based at least in part on the at least one discrepancy, a map of the environment, the map including the second representation associated with the second object and the third object, wherein the map omits the fourth object;

determining, based at least in part on the map, a route for the second robotic device to complete a task within the environment; and sending route data associated with the route to the second robotic device, wherein the second robotic device uses the route data to travel along the route.

2. The method of claim 1, further comprising sending map data associated with the map to a second robotic device, wherein the second robotic device is configured to utilize the map data to traverse the environment.

3. The method of claim 1, wherein:

the 3D spatial map represents a first 3D map of the environment;

the layout represents a second 3D map of the environment; and the map represents a third 3D map of the environment.

4. The method of claim 1, wherein the sensor data is based at least in part on:

first sensor data generated by the one or more 3D imaging sensors at a third location of the robotic device within the at least the portion of the environment; and second sensor data generated by the one or more 3D imaging sensors at a fourth location of the robotic device within the at least the portion of the environment.

5. The method of claim 1, wherein the static object is one of a frame, structure, or pillar.

6. The method of claim 1, further comprising:

determining an amount of time that has elapsed since generating the map;

determining that the amount of time is greater than a threshold; and based at least in part on the amount of time being greater than the threshold, causing the robotic device or a second robotic device to scan at least a second portion of the environment.

7. A method comprising:

determining at least a portion of an environment to be scanned by a first robotic device; receiving, from the first robotic device, sensor data generated by one or more sensors of the first robotic device;

generating, based at least in part on the sensor data, a three dimensional (3D) spatial map representing the at least the portion of the environment;

identifying, based at least in part on layout data, a layout of the environment, the layout being representative of one or more objects within the environment;

aligning the 3D spatial map and at least a portion of the layout;

determining, based at least in part on aligning the 3D spatial map and the at least the portion of the layout, a discrepancy between a first location of a first instance of an object in the 3D spatial map and a second location of a second instance of the object in the layout;

determining a second object and a third object within the 3D spatial map, wherein the second object represents a static object within the environment, and the third object represents a dynamic object within the environment;

generating, based at least in part on the discrepancy, a map of the environment including the object and the second object, and wherein the map omits the third object;

determining a first classifier associated with the object in the layout;

determining, based at least in part on the first classifier, a second classifier of the object;

sending, to a second robotic device, data associated with the map, the second robotic device being configured to utilize the data to traverse the environment;

determining, based at least in part on the map, a route for the second robotic device to complete a task within the environment; and sending route data associated with the route to the second robotic device, wherein the second robotic device uses the route data to travel along the route.

8. The method of claim 7, further comprising:

determining a route along which the first robotic device is to travel to scan the at least the portion of the environment; and sending route data associated with the route to the first robotic device, wherein the first robotic device uses the route data to autonomously travel along the route.

9. The method of claim 8, wherein:

the sensor data is received as the first robotic device travels along the route; or the sensor data is received upon the first robotic device completing the route.

10. The method of claim 7, wherein the map includes the second classifier of the object.

11. The method of claim 7, further comprising:

providing, as an input to a machine-learned model, the sensor data;

receiving, as an output of the machine-learned model, an indication of a first classifier of the first instance of the object; and determining, based at least in part on the layout data, a second classifier of the second instance of the object, wherein aligning the 3D spatial map with the at least the portion of the layout is based at least in part on the first classifier and the second classifier.

12. The method of claim 7, further comprising:

determining at least one of:

a first origin associated with the 3D spatial map, or a first reference point within the 3D spatial map; and determining at least one of:

a second origin associated with the at least the portion of the layout, or a second reference point within the at least the portion of the layout, wherein aligning the 3D spatial map and the at least the portion of the layout is based at least in part on at least one of:

aligning the first origin with the second origin, or aligning the first reference point with the second reference point.

13. The method of claim 7, wherein the first instance of the object represents a first pillar extending from a floor of the environment, further comprising:

determining a second object within the 3D spatial map, the second object representing a second pillar extending from the floor of the environment; and determining, based at least in part on the map of the environment, a distance extending between the first pillar and the second pillar.

14. The method of claim 7, wherein determining the second classifier of the object is based at least in part aligning the 3D spatial map and the at least the portion of the layout.

15. The method of claim 7, wherein determining the discrepancy is based at least in part on first coordinates associated with the first location of the first instance of the object in the 3D spatial map and second coordinates associated with the second location of the second instance of the object in the layout.

* * * * *